United States Patent
Sheikh et al.

(10) Patent No.: US 9,307,409 B2
(45) Date of Patent: Apr. 5, 2016

(54) APPARATUS, SYSTEM AND METHOD OF PROTECTING DOMAINS OF A MULTIMODE WIRELESS RADIO TRANSCEIVER

(71) Applicant: Intel Corporation, Santa Clara, CA (US)

(72) Inventors: Farhana Asrar Sheikh, Portland, OR (US); Patrick Koeberl, Dublin (IE); Jesse Walker, Portland, OR (US); Hossein Alavi, Portland, OR (US); Men Long, Beaverton, OR (US); Ram Kumar Krishnamurthy, Portland, OR (US); Alpa T. Narendra Trivedi, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 103 days.

(21) Appl. No.: 14/141,477

(22) Filed: Dec. 27, 2013

(65) Prior Publication Data
US 2015/0189509 A1    Jul. 2, 2015

(51) Int. Cl.
| H04L 29/06 | (2006.01) |
| H04W 12/08 | (2009.01) |
| H04W 24/04 | (2009.01) |
| H04W 88/06 | (2009.01) |

(52) U.S. Cl.
CPC ............... *H04W 12/08* (2013.01); *H04L 63/10* (2013.01); *H04W 24/04* (2013.01); *H04W 88/06* (2013.01)

(58) Field of Classification Search
CPC . H04W 48/18; H04W 88/06; H04W 52/0216; H04W 52/0245; H04W 52/0254

USPC .................................................... 726/4
See application file for complete search history.

(56) References Cited

U.S. PATENT DOCUMENTS

| 6,745,307 | B2 | 6/2004 | McKee |
| 7,406,328 | B2 | 7/2008 | Wallace |
| 2006/0149911 | A1 | 7/2006 | Kimelaman et al. |
| 2006/0172736 | A1* | 8/2006 | Nevo .......................... 455/435.1 |
| 2007/0011419 | A1 | 1/2007 | Conti |
| 2008/0244155 | A1 | 10/2008 | Lee et al. |
| 2008/0276051 | A1 | 11/2008 | Renno |
| 2009/0113141 | A1 | 4/2009 | Bullman et al. |

(Continued)

FOREIGN PATENT DOCUMENTS

WO    2011050235 A1    4/2011

OTHER PUBLICATIONS

Suvda Myagmar, Secure Configuration for Software Defined Radio; B.S., Concord University, 2001 M.S., University of Illinois at Urbana-Champaign, 2005, pp. 1-137; URl: http://hdl.handle.net/2142/11435.*

(Continued)

*Primary Examiner* — Harunur Rashid
(74) *Attorney, Agent, or Firm* — Shichrur & Co.

(57) ABSTRACT

Some demonstrative embodiments include apparatuses, systems and/or methods of protecting domains of a multimode wireless radio transceiver. For example, an apparatus may include a protection domain controller (PDC) to restrict access of a configuration software to a protection domain of a plurality of protection domains of a multimode wireless radio transceiver based on a security level of the configuration software, wherein the protection domain includes one or more radio configuration parameters of the multimode wireless radio transceiver.

23 Claims, 11 Drawing Sheets

(56) References Cited

U.S. PATENT DOCUMENTS

| | | | |
|---|---|---|---|
| 2010/0077445 A1 | 3/2010 | Schneider et al. | |
| 2010/0146274 A1 | 6/2010 | Naslund et al. | |
| 2011/0007849 A1 | 1/2011 | Jones | |
| 2011/0167483 A1* | 7/2011 | Lee et al. | 726/6 |
| 2011/0310806 A1* | 12/2011 | Karaoguz et al. | 370/328 |
| 2012/0215991 A1 | 8/2012 | Moyer | |
| 2013/0210483 A1 | 8/2013 | Zimmer et al. | |
| 2013/0283049 A1 | 10/2013 | Brown et al. | |
| 2013/0303148 A1 | 11/2013 | Karaoguz et al. | |
| 2015/0032996 A1 | 1/2015 | Koeberl et al. | |

OTHER PUBLICATIONS

Patrick Koeberl et al., entitled "Execution-Aware memory Protection", U.S. Appl. No. 13/952,849, filed Jul. 29, 2013, 76 pages.

Li et al., "An Architecture for Secure Software Defined Radio", in Proc. of 2009 Date Conference and Exhibition, Nice, France, Apr. 2009, 6 pages.

Hawblitzel et al., "Implementing Multiple Protection Domains in Java", in Proc. of 1998 USENIX Annual Technical Conference, New Orleans, LA, Jun. 1998, 4 pages.

International Search Report and Written Opinion for International Application No. PCT/US2014/067797, mailed on Feb. 27, 2015, 9 pages.

International Search Report and Written Opinion for PCT/US2014/048480, mailed on Nov. 12, 2014, 9 pages.

Notice of Allowance for U.S. Appl. No. 13/952,849, mailed on Dec. 14, 2015, 16 pages.

Office Action for Taiwanese Patent Application No. 103141002, mailed on Nov. 24, 2015, 12 pages (Including 2 pages of English translation).

* cited by examiner

APPARATUS, SYSTEM AND METHOD OF PROTECTING DOMAINS OF A MULTIMODE WIRELESS RADIO TRANSCEIVER

TECHNICAL FIELD

Embodiments described herein generally relate to protecting domains of a multimode wireless radio transceiver.

BACKGROUND

A radio transceiver may be configured to support a radio access technology (RAT). For example, the radio transceiver may support a Wireless Fidelity (WiFi) technology, a Long Term Evolution (LTE) technology, a $3^{rd}$ Generation (3G) technology, and/or any other RAT.

A hardware platform of the radio transceiver may include one or more hardware elements having different levels of programmability and/or reconfiguration.

A reconfigurable radio transceiver may enable reconfiguring one or more radio functionalities of the transceiver, for example, carrier frequencies, a spectrum bandwidth, a modulation technique, a coding technique, and/or any other radio attribute, for example, by reconfiguring the hardware elements.

The reconfigurable radio transceiver may be reconfigured by a configuration software, which may include, for example, code and data to modify the radio functionalities.

The reconfigurable radio transceiver may be susceptible to security breaches and malware attacks, for example, by a malicious configuration software.

For example, the malicious configuration software may modify radio frequency (RF) parameters such that the reconfigurable radio transceiver may not operate according to regulations, e.g., the Federal Communications Commission (FCC) regulations, in a way which may cause interferences to neighboring communication networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
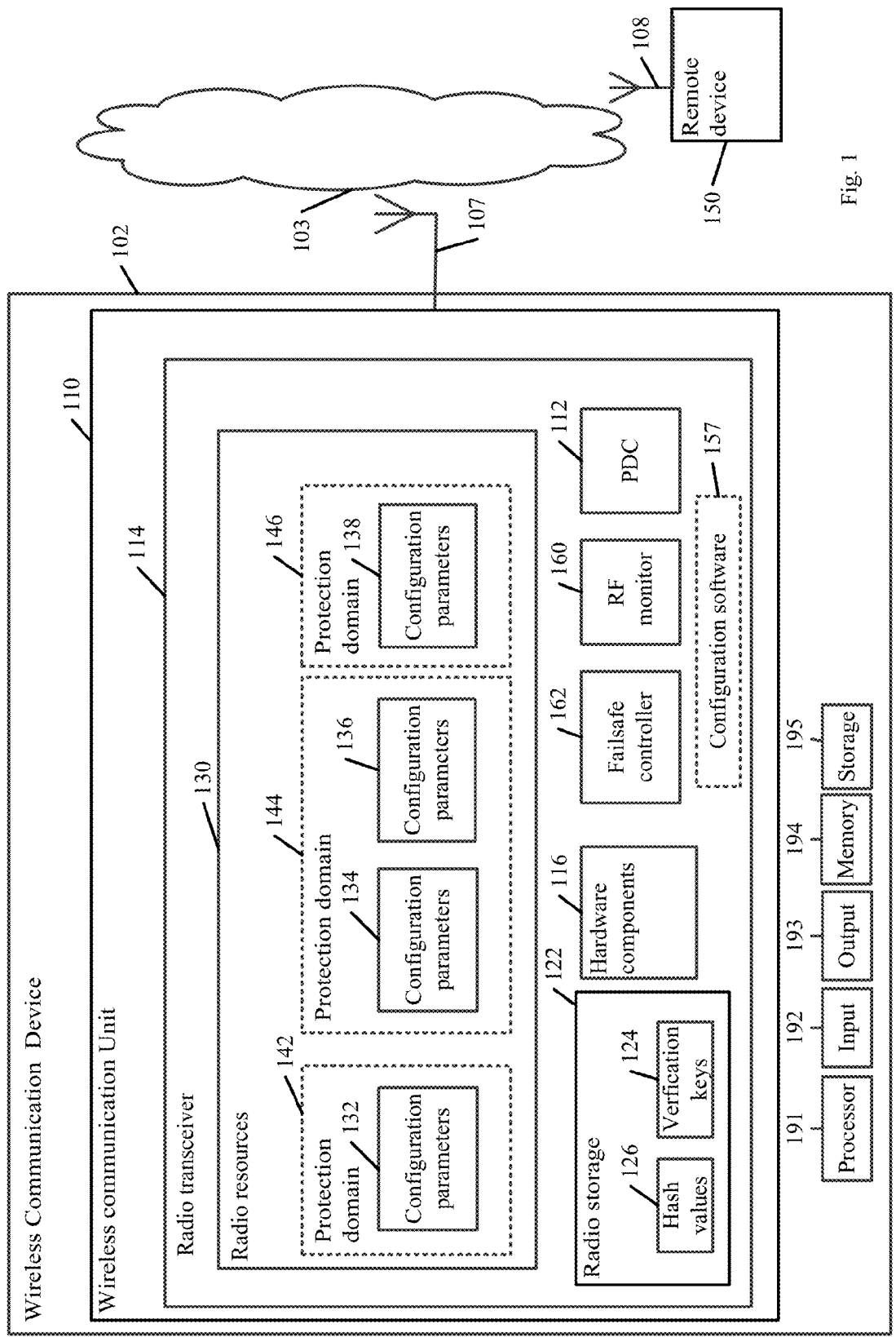
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; IEEE802.11 task group ac (TGac) ("*IEEE*802.11-09/0308r12—*TGac Channel Model Addendum Document*"); IEEE 802.11 task group ad (TGad) (*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band,* 28 *Dec.,* 2012)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), 3GPP Long Term Evolution Advanced (LTE-A) (including Release 10, 11, 12 and/or 13), and/or future versions and/or derivatives thereof, devices and/or networks operating in accordance with existing World-Wide-Web Consortium (W3C) standards, including the *W*3*C Hypertext Markup Language* (*HTML*) *Version* 5, *October* 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), FOMA (Freedom of Multimedia Access), 3GPP LTE (Long Term Evolution), 3GPP LTE Advanced (Long Term Evolution Advanced), CDPD (Cellular Digital Packet Data), CSD (Circuit Switched Data), HSCSD (High-Speed Circuit-Switched Data), UMTS (3G) (Universal Mobile Telecommunications System (Third Generation)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

Some demonstrative embodiments may be used in conjunction with a cellular communication network communicating over Long Term Evolution (LTE) communication network. Other embodiments may be implemented utilizing any other suitable cellular communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include a wireless communication device 102 and a remote device 150. Wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, wireless communication device 102 may include a mobile device. In other embodiments, device 102 may include a non-mobile device.

In some demonstrative embodiments, wireless communication device 102 may include, for example, a PC, a desktop computer, a mobile computer, a laptop computer, a notebook computer, a tablet computer, an Ultrabook™ computer, a mobile internet device, a server computer, a handheld computer, a handheld device, a PDA device, a handheld PDA device, an on-board device, an off-board device, a hybrid device (e.g., combining cellular phone functionalities with PDA device functionalities), a wearable device, an Internet of Things (IoT) device, a Machine to Machine (M2M) device, a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, a video sink, a stereo tuner, a flat panel display, a Personal Media Player (PMP), a digital video camera (DVC), a gaming device, a Digital Still camera (DSC), a media player, a Smartphone, a television, or the like.

In some demonstrative embodiments, wireless communication device 102 may also include, for example, a processor 191, an input unit 192, an output unit 193, a memory unit 194, and a storage unit 195. Wireless communication device 102 may optionally include other suitable hardware components and/or software components. In some demonstrative embodiments, some or all of the components of mobile device wireless communication device 102 may be enclosed in a common housing or packaging, and may be interconnected or operably associated using one or more wired or wireless links. In other embodiments, components of wireless communication device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of device 102 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, wireless medium 103 may include for example, a Radio Frequency (RF) channel, an IR channel, a WiFi channel, a wireless display (WiDi) channel, a Bluetooth channel, a cellular channel, a Global Navigation Satellite System (GNSS) channel, a Near Field Communication (NFC) channel, a Hybrid Digital Radio (HDR) channel, a Frequency Modulation (FM) channel, and the like.

In some demonstrative embodiments, wireless communication device 102 may include a wireless communication unit 110 to perform wireless communication between wireless communication device 102 and one or more other wireless communication devices, e.g., remote device 150.

In some demonstrative embodiments, wireless communication unit 110 may be associated with one or more antennas 107. Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a single element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, wireless communication unit 110 may include a wireless radio transceiver 114. For example, radio transceiver 114 may include one or more wireless transmitters, receivers and/or transceivers able to send and/or receive wireless communication signals, RF signals, frames, blocks, transmission streams, packets, messages, data items, and/or data. In one example, radio transceiver 114 may include one or more hardware (HW) components 116, e.g., modulation elements, demodulation elements, amplifiers, analog to digital and digital to analog converters, filters, and/or the like. For example, wireless communication unit 110 may include or may be implemented as part of a wireless Network Interface Card (NIC), and the like.

In some demonstrative embodiments, radio transceiver 114 may support a first radio access technology (RAT). For example, hardware components 116 of radio transceiver 114 may support a WiFi technology, an LTE technology, a 3G technology, or any other technology.

In some demonstrative embodiments, radio transceiver 114 may include a multimode wireless reconfigurable radio transceiver, for example, HW components 116 of radio transceiver 114 may be reconfigurable, e.g., having programming and/or reconfiguration capabilities to enable supporting of multimode.

In some demonstrative embodiments, configuring of radio transceiver 114 may enable supporting a second RAT, e.g., different from the first RAT, for example, without modifying hardware components 116 of radio transceiver 114.

In one example, radio transceiver 114 may be configured to support a first type of technology, e.g., a WiFi technology. According to this example, configuring of radio transceiver 114 may enable radio transceiver 114 to support a second type of technology, e.g., an LTE technology, for example, to communicate with a cellular base station.

In another example, radio transceiver 114 may be configured to support a first type of WLAN communication, e.g., WLAN communication according to the *IEEE* 802.11-2012 specification. According to this example, configuring of radio transceiver 114 may enable radio transceiver 114 to support a second type of WLAN communication, e.g., WLAN communication according to the *IEEE* 802.11 *TGac* specification.

In some demonstrative embodiments, radio transceiver 114 may include one or more radio resources 130 to configure one or more functionalities of radio 114. For example, resources 130 may enable configuring HW components 116 to support the second RAT.

In some demonstrative embodiments, radio resources 130 may include one or more hardware registers and/or one or more memory resources of radio 114 configured to store data relating to configuration and/or modification of the functionalities for radio 114.

In some demonstrative embodiments, the hardware registers and/or the memory resources of radio 114 may store one or more radio configuration parameters relating to the functionalities for radio 114.

In some demonstrative embodiments, radio resources 130 may include radio configuration parameters 132, 134, 136 and/or 138. For example, parameters 132, 134, 136 and/or 138 may include one or more parameters configured to modify, to set, and/or to restrict output power levels; power spectral density levels; a band width; out of band radiation masks and/or levels; modulation types, e.g., CDMA, WCDMA, OFDM, OFDM-A, Single Carrier, TDS-OFDM, PRP-OFDM, IOTA-OFDM, SC-FDMA and the like; an Analog-to-Digital Converter (ADC) precision and/or speed; a Digital-to-Analog Converter (ADC) precision and/or speed; an antenna selection; a number of sub-carriers to be selected; a sub-carrier spacing to be selected; MIMO techniques (multiple-input-multiple-output multi-antennas techniques) to be selected; FEC (Forward Error Correction) techniques to be selected; Duplex techniques to be selected, e.g., FDD, TDD, and the like; MAC techniques to be selected, e.g., TDMA, FDMA, CSMA, and the like.

In some demonstrative embodiments, setting and/or modifying of configuration parameters 132, 134, 136 and/or 138 may configure and/or modify the functionalities for radio 114.

In some demonstrative embodiments, radio 114 may be configured by a configuration software 157 including code and/or data to configure radio 114.

In some demonstrative embodiments, configuration software 157 may include a software module configuring radio 114. For example, configuration software 157 may include a software module to setup and/or to configure the functionalities of radio 114, a software module to be executed, loaded, installed, and/or running on radio 114; and/or any other software module, which utilizes hardware components 116 of radio 114.

In some demonstrative embodiments, configuration software 157 may include different types of software in a different level of hierarchy.

In one example, configuration software 157 may include a boot code embedded on a persistent memory, e.g., read only memory (ROM) of radio 114, configured to initiate a basic setup of radio 114 upon boot of radio 114.

In another example, configuration software 157 may include a firmware of radio 114 configured to initialize basic I/O setting and basic functionalities for radio 114, e.g., after booting of radio 114.

In another example, configuration software 157 may include an operating system of radio 114 and/or one or more tasks of the operating system configured to manage hardware components 116; and/or to provide one or more services for radio applications and/or tasks. For example, configuration software 157 may include an embedded configurable operating system (ECOS) and one or more tasks of ECOS.

In another example, configuration software 157 may include a radio application configured to modify one or more functionalities for radio 114. For example, the radio application may modify radio 114 to support the second RAT.

In some demonstrative embodiments, configuration software 157 may configure radio 114 by setting and/or modifying radio configuration parameters 132, 134, 136 and/or 138. For example, configuration software 157 may include code to restrict the output power level of radio 114 and an associated value representing the restricted output power level. Execution of configuration software 157 may modify an output power level parameter in radio configuration parameters 132.

In some demonstrative embodiments, configuration software 157 may be required to access parameters 132, 134, 136, and/or 138 to set and/or to modify radio configuration parameters 132, 134, 136 and/or 138, for example, during an execution of configuration software 157.

In some demonstrative embodiments, radio 114 may be susceptible to security breaches and/or malware attacks of different types. For example, radio 114 may be susceptible to a naive adversary, a network adversary, an unprivileged software adversary, a system software adversary and/or a simple hardware adversary, for example, if configuration software 157 includes a malicious software, a theft of licensed services, a malware and/or any other type of an unauthorized software.

The malicious software may cause radio 114 not to operate according to one or more regulations, e.g., the Federal Communications Commission (FCC) regulations, and/or to adopt a malicious behavior.

In one example, the malicious behavior may disrupt and/or interfere communication networks, for example, by jamming, congesting and/or by adopting a malicious behavior.

In some demonstrative embodiments, preventing the malicious software to access and/or to modify radio configuration parameters 132, 134, 136 and/or 138 may prevent from the malicious software to modify the functionalities for radio 114 and/or from misusing of radio 114.

In one example, preventing the malicious software from accessing and/or modifying radio configuration parameters 132, 134, 136 and/or 138 may be implemented in the operating system by restricting access of one or more process to various regions of memory by utilizing virtual memory to enforce protection between the processes. According to this implementation, a process cannot directly read or write into other processes regions of memory. However, this implementation requires an inter-process communication between the processes, e.g., to enforce the protection between the processes utilizing one or more traps to a memory Kernel, which may be relatively of high cost due to the mediation in the Kernel and switching of address spaces.

In another example, preventing the malicious software from accessing and/or modifying radio configuration parameters 132, 134, 136 and/or 138 may be implemented utilizing a safe language technology, e.g., Java, which uses type safety and controlled linking to enforce protection between multiple process, e.g., using function calls. However, this implementation may not be suitable for a resource-constrained device. For example, radio 114 may not be able to utilize the safe language technology, for example, if radio 114 has limited computing resources, limited power resources and/or limited hardware components, e.g., compared to a personal computer (PC), and/or any other computing device.

In another example, preventing the malicious software from accessing and/or modifying radio configuration parameters 132, 134, 136 and/or 138 may be implemented by utilizing a security module to secure download and installation of configuration software and/or to secure modification of radio configuration parameters 132, 134, 136 and/or 138.

The security module may be implemented in software or hardware. However, the hardware security module may not be easily adapted to a changing environment of the multimode radio transceiver and may not be easily updated; and the software security module may be vulnerable to malware attacks by the malicious software.

Some demonstrative embodiments may be configured to enable preventing malicious software from accessing radio configuration parameters 132, 134, 136 and/or 138, for example, by utilizing a firmware security module, e.g., as described below.

Some demonstrative embodiments may prevent malicious software from accessing radio configuration parameters 132, 134, 136 and/or 138, for example, by enforcing the type of a configuration software, which may be allowed to access resources 130, e.g., as described below.

Some demonstrative embodiments may utilize protection domains and a signed launch policy to determine, for example, which protection domains can be accessed by different types of configuration software.

In some demonstrative embodiments, radio 114 may include a protection domain controller (PDC) 112 to restrict access of configuration software 157 to a protection domain of a plurality of protection domains of multimode wireless radio transceiver 114 based on a security level of configuration software 157, e.g., as described below.

In some demonstrative embodiments, PDC 112 may be implemented in a firmware of radio 114. In other embodiments, PDC 112 may be implemented utilizing a software, a hardware and/or any other combination of hardware and software.

In some demonstrative embodiments, the protection domain may include one or more restricted radio resources of resources 130 including one or more radio configuration parameters of radio configuration parameters 132, 134, 136 and/or 138.

In some demonstrative embodiments, the plurality of protection domains may include at least three different protection domains. For example, the three protection domains may have different levels of access to resources 130.

In some demonstrative embodiments, a first protection domain 142 may include a privileged protection domain, in which one or more external certifications are required for a configuration software to access one or more radio resources of the first domain. For example, configuration software 157 may be required to have a highest level of security to access first protection domain 142.

In some demonstrative embodiments, a second protection domain 144 may include a reduced privilege protection domain, in which one or more internal certifications are required for a configuration software to access one or more radio resources of the second protection domain. For example, configuration software 157 may be required to have a moderate level of security to access second protection domain 144.

In some demonstrative embodiments, a third protection domain 146 may include an unprivileged protection domain, in which minimal or no certification is required for a configuration software for access one or more radio resources of the third protection domain. For example, configuration software 157 may be required to have a lower level of security or not be required to have any level of security to access third protection domain 146.

In some demonstrative embodiments, protection domain 142 may include one or more restricted radio resources including radio configuration parameters 132, protection domain 144 may include one or more restricted radio resources including radio configuration parameters 134 and 136, and/or protection domain 146 may include one or more restricted radio resources including radio configuration parameters 138.

In another embodiments, protection domains 142, 144 and/or 146 may share one or more radio configuration parameters of radio configuration parameters 132, 134, 136 and/or 138. For example, both of protection domains 142 and 144 may include radio configuration parameters 132.

In another embodiments, a first protection domain may include all radio configuration parameters of a second protection domain, for example, if the first protection domain has a greater security level than the second protection domain. For example, protection domain 142 may include radio configuration parameters 132, 134, 136 and 138, protection domain 144 may include radio configuration parameters 134, 136 and 138, and/or protection domain 146 may include radio configuration parameters 138.

In some demonstrative embodiments, PDC 112 may enable configuration software 157 to access radio configuration parameters 132, 134, 136 and/or 138 to configure radio 114 based on the security level of configuration software 157.

In some demonstrative embodiments, PDC 112 may restrict access of configuration software 157 to a protection domain based on the security level of configuration software 157.

In one example, PDC 112 may restrict configuration software 157 to protection domain 142, to enable access to radio configuration parameters 132, for example, if configuration software 157 has a first security level; and/or PDC 112 may restrict configuration software 157 to protection domain 144, to enable access to radio configuration parameters 134 and/or 136, for example, if configuration software 157 has a second security level, e.g., lesser than the first security level.

In some demonstrative embodiments, configuration software 157 may include a launch policy defining one or more resources of resources 130 to be accessible by configuration software 157. For example, the launch policy may define configuration parameters 132 to be accessible by configuration software 157.

In some demonstrative embodiments, PDC 112 may determine a protection domain of protection domains 142, 144 and/or 146 to be accessible by configuration software 157 based on the launch policy of configuration software 157.

In some demonstrative embodiments, the launch policy of configuration software 157 may define the security level of configuration software 157.

For example, PDC 112 may determine protection domain 142 for configuration software 157 having a launch policy defining radio configuration parameters 132. Accordingly, configuration software 157 may be required to have a relatively high level of security.

In some demonstrative embodiments, configuration software 157 may include a public verification key and a digital signature verifying the code and the data of configuration software 157.

Figure 2:
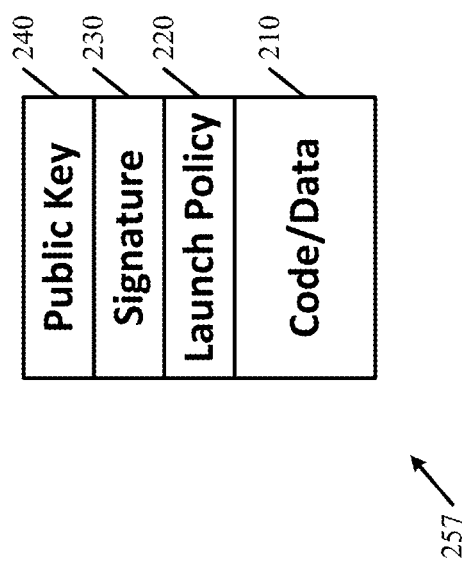
FIG. 2 is a schematic illustration of a software image of a configuration software, in accordance with some demonstrative embodiments.

Reference is made to FIG. 2, which schematically illustrates an image of configuration software 257, in accordance with some demonstrative embodiments. For example, configuration software 257 may perform the functionality of configuration software 157 (FIG. 1).

As shown in FIG. 2, configuration software 257 may include a code/data block 210 including a code to be executed on radio 114 (FIG. 1) and data associated with the code.

In some demonstrative embodiments, code/data block 210 may include only data, for example, to provide one or more operating parameters to one or more hardware components 116 (FIG. 1).

As shown in FIG. 2, software image 200 may include a launch policy block 220 defining which resources of resources 130 (FIG. 1) may be accessible by configuration software 257.

In some demonstrative embodiments, the launch policy may be defined during the design of configuration software 257, for example, by a designer and/or a programmer of configuration software 257.

As shown in FIG. 2, configuration software 257 may include a digital signature block 230 and a public key block 240 including a digital signature and an associated public verification key, respectively, to digitally sign and verify the code and the data of configuration software 257.

In some demonstrative embodiments, the code and the data of configuration software 257 may be verified by a vendor of configuration software 257, e.g., a hardware vendor, an original equipment manufacturer (OEM) and/or an independent software vendor (ISV).

In some demonstrative embodiments, upon verification of the code and data of configuration software 257 the vendor may provide the digital signature in block 230 and the associated public verification in block key 240.

Referring back to FIG. 1, in some demonstrative embodiments, radio 114 may include a radio storage 122. For example, radio storage 122 may include a persistent memory, e.g., read only memory (ROM), embedded on radio 114, e.g., as part of the NIC.

In some demonstrative embodiments, radio storage 122 may store one or more verification keys 124. For example, verification keys 124 may include one or more manifests, one or more signatures, one or more register values, one or more hash values, one or more keys, and/or one or more certificates.

In some demonstrative embodiments, PDC 112 may validate the public verification key and the digital signature of configuration software 157 with verification keys 124. For example, PDC 112 may verify the digital signature in block 230 (FIG. 2) and the public key in block 240 (FIG. 2) based on verification keys 124.

In some demonstrative embodiments, PDC 112 may enable configuration software 157 to access configuration parameters 132, 134, 136 and/or 138, for example, only if the digital signature and the public key of configuration software 157 are verified based on verification keys 124.

In some demonstrative embodiments, PDC 112 may generate a hardware trap in response to an attempt of configuration software 157 to access a radio resource of radio resources 130, which is not included in the protection domain specified by the launch policy of configuration software 157.

In some demonstrative embodiments, generating the hardware trap may enable radio 114 to recover from the attempt. For example, the hardware trap may initiate a recovery process to recover radio 114.

In one example, PDC 112 may enable configuration software 157 to access configuration parameters 134 and/or 136 of protection domain 144, for example, if the launch policy of configuration software 157 corresponds to protection domain 144, and the public verification key and the digital signature of configuration software 157 are verified based on verification keys 124; PDC 112 may generate a hardware trap, for example, if configuration software 157 is attempting to access configuration parameters 132 of protection domain 142 and/or the public verification key and the digital signature of configuration software 157 are not verified based on verification keys 124.

In some demonstrative embodiments, radio 114 may include a radio frequency (RF) monitor 160 to monitor one or more dynamic parameters of radio 114. For example, RF monitor 160 may be embedded on radio 114.

In some demonstrative embodiments, the dynamic parameters may relate to RF transmissions of radio 114.

In some demonstrative embodiments, the one or more dynamic parameters may include a transmission power of radio 114, a transmission frequency of radio 114, and/or an RF modulation of radio 114.

In other embodiments, the one or more dynamic parameters may include any other parameter relating to the RF transmissions of radio 114.

In some demonstrative embodiments, PDC 112 may control radio transceiver 114 to transmit values of the one or more dynamic parameters to remote device 150, for example, in response to a monitor request message received from remote device 150, e.g., as described below with reference to FIG. 9.

In some demonstrative embodiments, PDC 112 may validate a digital signature of the monitor request message, e.g., using verification keys 124, before transmitting the values of the dynamic parameters to remote device 150.

In some demonstrative embodiments, PDC 112 may control radio 114 not to transmit the values of the dynamic parameters to remote device 150, for example, if the digital signature of the monitor request message is not valid.

In some demonstrative embodiments, RF monitor 160 may generate an alert message, for example, if at least one dynamic parameter of the one or more dynamic parameters exceeds a predefined parameter threshold. For example, RF monitor 160 may generate an alert message if a transmission power of radio 114 exceeds a predefined transmitter power threshold.

In some demonstrative embodiments, PDC 112 may control radio transceiver 114 to transmit the alert message to remote device 150.

In some demonstrative embodiments, PDC 112 may store one or more hash values 126 representing configuration software 157, e.g., in radio storage 122.

In some demonstrative embodiments, PDC 112 may transmit hash values 126 to remote device 150, for example, in response to an attestation request message received from remote device 150, e.g., as described below with reference to FIG. 10.

In some demonstrative embodiments, PDC 112 may validate a digital signature of the attestation request message, e.g., using verification keys 124, before transmitting hash values 126 to remote device 150.

In some demonstrative embodiments, PDC 112 may control radio 114 not to transmit hash values 126 to remote device 150, for example, if the digital signature of the attestation request message is not valid.

In one example, remote device 150 may transmit the attestation request message to receive information from device 102 on one or more configuration software installed on radio 114. Receiving the hash values of the configuration software may enable remote device 150 to determine, for example, whether or not the configuration software installed on radio 114 is authorized.

In some demonstrative embodiments, radio 114 may include a failsafe controller 162 to control an operation of HW components 116. For example, failsafe controller 162 may control a power supply to HW components 116.

In some demonstrative embodiments, failsafe controller 162 may shutdown one or more HW components of HW components 116, for example, based on a failsafe message received from remote device 150. For example, failsafe controller 162 may shutdown power to the transmitters of radio 114 in response to the failsafe message received from remote device 150.

In some demonstrative embodiments, PDC 112 may validate a digital signature of the failsafe message, e.g., using verification keys 124, before shutting down the one or more HW components.

In some demonstrative embodiments, PDC 112 may not shutdown the HW components, for example, if the digital signature of the failsafe message is not valid.

In some demonstrative embodiments, the failsafe message may be in response to the alert message. For example, remote device 150 may transmit the failsafe message to shutdown power of a transmitter of radio 114, for example, if the alert message indicates the transmission power of radio 114 exceeds a predefined transmission power threshold, e.g., a maximum transmission power according to the FCC regulations.

In some demonstrative embodiments, the failsafe message may be in response to the transmitted hash value 126. For example, remote device 150 may transmit the attestation request message to device 102; radio 114 may receive the attestation request message and may transmit hash value 126, in response to the attestation request message. Remote device 150 may transmit the failsafe message to shutdown power to the transmitter of radio 114, for example, if hash value 126 does not match a hash value of an authorized configuration software, e.g., configuration software 157 is not authorized.

In some demonstrative embodiments, the failsafe message may be initiated by remote device 150. For example, remote device 150 may initiate the failsafe message for network traffic managing purposes.

In some demonstrative embodiments, PDC 112 may implement one or more mechanisms to restrict access to the plurality of protection domains.

In some demonstrative embodiments, PDC 112 may implement a memory access control mechanism. For example, PDC 112 may prevent configuration software 157 from accessing designated memory regions of resources 130, e.g., code regions, data regions, memory-mapped input/output regions (MMIO), unless explicitly authorized, for example, by the launch policy of configuration software 157, e.g., as described above.

In some demonstrative embodiments, PDC 112 may implement a hardware-based Root of Trust (RoT) mechanism.

In some demonstrative embodiments, the RoT mechanism may be established by a chain of trust between software modules. For example, the RoT mechanism may include a sequence of stages, a first stage of launching an immutable trusted code embedded on the persistent memory of radio 114 upon boot of radio 114, e.g., as described below with reference to FIG. 5; a second stage of launching a security firmware module based on the immutable trusted code, a third stage of launching an operating system (OS) of radio 114 based on the immutable trusted code, e.g., as described below with reference to FIG. 5; and a fourth stage of launching one or more tasks based on the operating system, e.g., as described below with reference to FIG. 7.

In some demonstrative embodiments, PDC 112 may implement a secure launch mechanism. For example, PDC 112 may assure an integrity and authenticity of configuration software 157 before launching configuration software 157. For example, PDC 112 may validate the public key and the digital signature of configurations software 157 using verification keys 124.

In some demonstrative embodiments, PDC 112 may assure that radio 114 is operating within regulatory constraints, e.g., as described above.

In some demonstrative embodiments, PDC 112 may assure that radio 114 is updated and configured by an operator of radio 114, e.g., a network manager, a user of radio 114, a cellular operator and/or the like. For example, PDC 112 may not enable an unauthorized configuration software to configure radio 114, e.g., as described above.

In some demonstrative embodiments, PDC 112 may assure that radio 114 conforms with one or more rules, e.g., one or more regulatory constraints, a vendor implementation and/or one or more operator policies, e.g., as described above.

Figure 3:
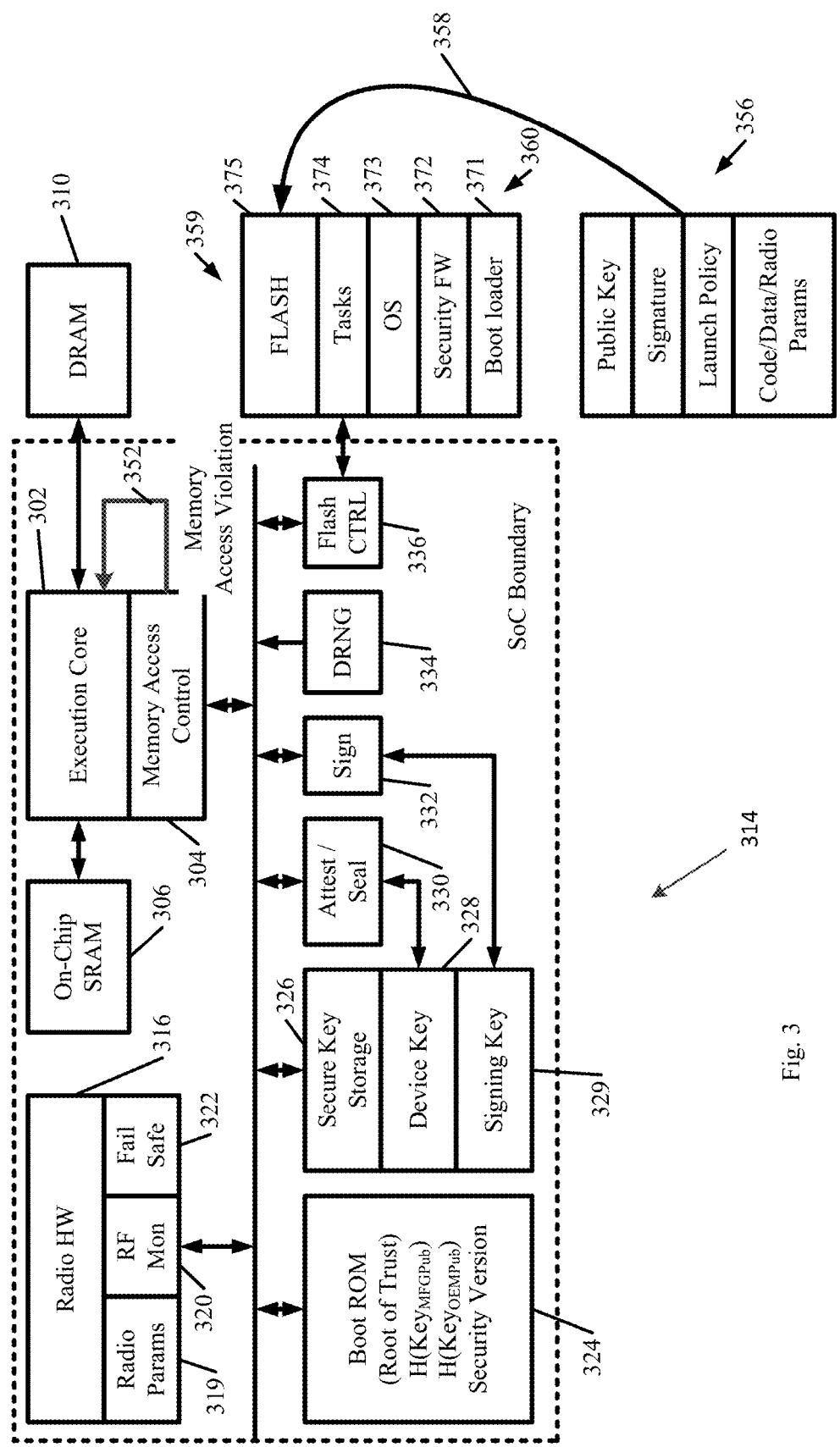
FIG. 3 is a schematic illustration of a hardware architecture of a multimode wireless radio transceiver, in accordance with some demonstrative embodiments.

Reference is made to FIG. 3, which schematically illustrates a radio hardware architecture 314 of a multimode wireless radio transceiver, in accordance with some demonstrative embodiments. For example, radio 114 (FIG. 1) may include hardware architecture 314.

In some demonstrative embodiments, utilizing of protection domains may leverage hardware architecture 314, e.g., as described below.

As shown in FIG. 3, radio architecture 314 may include one or more HW units, to perform one or more functionalities for radio 114 (FIG. 1).

In some demonstrative embodiments, radio architecture 314 may be utilized to update functionalities of radio 114 (FIG. 1) utilizing a secure update mechanism, e.g., as described below.

In some demonstrative embodiments, the secure update mechanism of radio architecture 314 may include a sequential loading of software module images 360 from a storage 359 into radio architecture 314.

In some demonstrative embodiments, storage 359 may include a non-volatile memory (NVM) storage 359, e.g., a flash memory or any other NVM storage.

As shown in FIG. 3, software module images 360 may include a boot loader image 371 configured to setup radio 114 (FIG. 1) upon reset and/or boot of radio 114 (FIG. 1), a security firmware image 372 configured to load security settings for radio 114 (FIG. 1), an operating system (OS) image 373 configured to load an OS of radio 114 (FIG. 1), and/or one or more tasks and/or processes images 374 relating to OS 373 and or radio applications.

In some demonstrative embodiments, the sequential loading of software modules 360 may establish the RoT chain, such that each software modules is launched by a previously trusted software module.

As shown in FIG. 3, a software image 356 of configuration software 157 (FIG. 1) to configure radio architecture 314 may be loaded and/or stored (358) into storage 359.

As shown in FIG. 3, NVM storage 359 may not be embedded on radio architecture 314, e.g., NVM 359 may be implemented as part of an off-chip hardware component, and may be connected to radio architecture 314.

As shown in FIG. 3, NVM storage 359 may be connected to radio architecture 314 via a flash controller 336 configured to control loading of software modules 360 into radio architecture 314.

As shown in FIG. 3, radio architecture 314 may include an execution core 302 configured to execute an instruction set to perform one or more computational tasks, one or more data transfers or one on more input/output (IO) operations. For example, execution core 302 may execute the code and the associated data of boot loader image 371, security firmware image 372, OS image 373, and/or tasks images 374.

As shown in FIG. 3, radio architecture 314 may include a memory access control unit 304 integral to execution core 302 configured to enforce a memory access control policy on configuration software 157 (FIG. 1). For example, memory access control unit 304 may perform the functionality of PDC 112 (FIG. 1).

In some demonstrative embodiments, memory access control unit 304 may include Direct memory access (DMA) controllers configured to map a configuration software into restricted memory regions and/or range registers configured to restrict the configuration software to specific regions of memory.

In some demonstrative embodiments, security firmware image 372 may configure memory access control unit 304 by programming the DMA controllers and range registers, e.g., upon execution of security firmware 372 and after the initial boot of radio 114 (FIG. 1).

In one example, memory access control unit 304 may prevent configuration software 157 (FIG. 1) from accessing other configuration software data, executing other configuration software code and/or accessing one or more resources 130 (FIG. 1).

In another example, memory access control unit 304 may generate a hardware trap 352, for example, if a DMA controller and/or a range register attempt to access an illegal region of the memory.

As shown in FIG. 3, radio architecture 314 may include an embedded random access memory (RAM) 306, e.g., an on-chip static RAM (SRAM) and/or any other RAM technology, configured to store data for execution of configuration software 157 (FIG. 1).

In one example, RAM 306 may be utilized to execute one or more security critical tasks of configuration software 157 (FIG. 1), for example, without exposing the security critical tasks to one or more elements outside of radio architecture 314, e.g., off-chip hardware/software elements.

As shown in FIG. 3, radio architecture 314 may include a Radio HW 316 to implement one or more functionalities of radio 114 (FIG. 1). For example, radio HW 316 may perform the functionality of HW components 116 (FIG. 1).

As shown in FIG. 3, Radio HW 316 may include one or more radio parameters 319, e.g., radio configuration parameters 132, 134, 136 and/or 138 (FIG. 1).

As shown in FIG. 3, Radio HW 316 may include a radio frequency (RF) monitoring unit 320 to enable dynamic monitoring of RF emissions of radio 114 (FIG. 1). For example, RF monitoring unit 320 may perform the functionality of RF monitor 160 (FIG. 1).

In one example, RF monitoring unit 320 may determine whether or not radio 114 (FIG. 1) is operating according to regulations. For example, RF monitoring unit 320 may monitor the dynamic parameters to determine whether or not radio 114 (FIG. 1) is operating according to the FCC regulations.

As shown in FIG. 3, Radio HW 316 may include a fail-safe unit 322 to enable shutting down remotely one or more HW components of HW architecture if required. For example, fail-safe unit 322 may perform the functionality of failsafe controller 162 (FIG. 1).

As shown in FIG. 3, radio architecture 314 may include a read only memory (ROM) unit 324 to store immutable code for booting of radio 114. For example, ROM unit 324 may perform the functionality of radio storage 122 (FIG. 1).

As shown in FIG. 3, ROM unit 324 may store immutable trusted code, e.g., Root of Trust (ROT) code, for initial boot of radio 114 (FIG. 1). For example, ROM unit 324 may store boot loader image 371.

As shown in FIG. 3, ROM unit 324 may store one or more public verification keys, e.g., verification keys 124 (FIG. 1), for validating configuration software 157 (FIG. 1), and/or a security version of radio 114 (FIG. 1).

As shown in FIG. 3, radio architecture 314 may include a secure key storage unit 326 to store one or more security parameters of radio 114 (FIG. 1). For example, secure key storage unit 326 may store a device key 328 to encrypt data associated with device 102 (FIG. 1), and/or a signing key 329 to digitally sign the data.

In one example, device key 328 may include a symmetric device specific key and/or signing key 329 may include an asymmetric signing key.

In some demonstrative embodiments, secure key storage unit 326 may not be accessible by external modules and/or components, e.g., outside of HW architecture 314, to prevent read-out of the security parameters.

As shown in FIG. 3, radio architecture 314 may include an Attestation/Sealing unit 330 to store one or more attestation parameters, e.g., one or more hash values of one or more configuration software and/or data.

In some demonstrative embodiments, Attestation/Sealing unit 330 may include a sealing module to enable data to be encrypted according to one or more confidentiality requirements, e.g., using device key 328.

In some demonstrative embodiments, the data may be optionally bound to the attestation parameters.

As shown in FIG. 3, radio architecture 314 may include a signing unit 332 to sign data, for example, by utilizing signing key 329.

As shown in FIG. 3, radio architecture 314 may include a random number generator (RNG) unit 334 to generate random numbers to support one or more security protocols, which are based on arbitrary numbers, e.g., a session key establishment.

As shown in FIG. 3, radio architecture 314 may include a non-persistent memory, e.g., dynamic RAM (DRAM) unit 310, and or any other technology, to store one or more volatile parameters.

Figure 4:
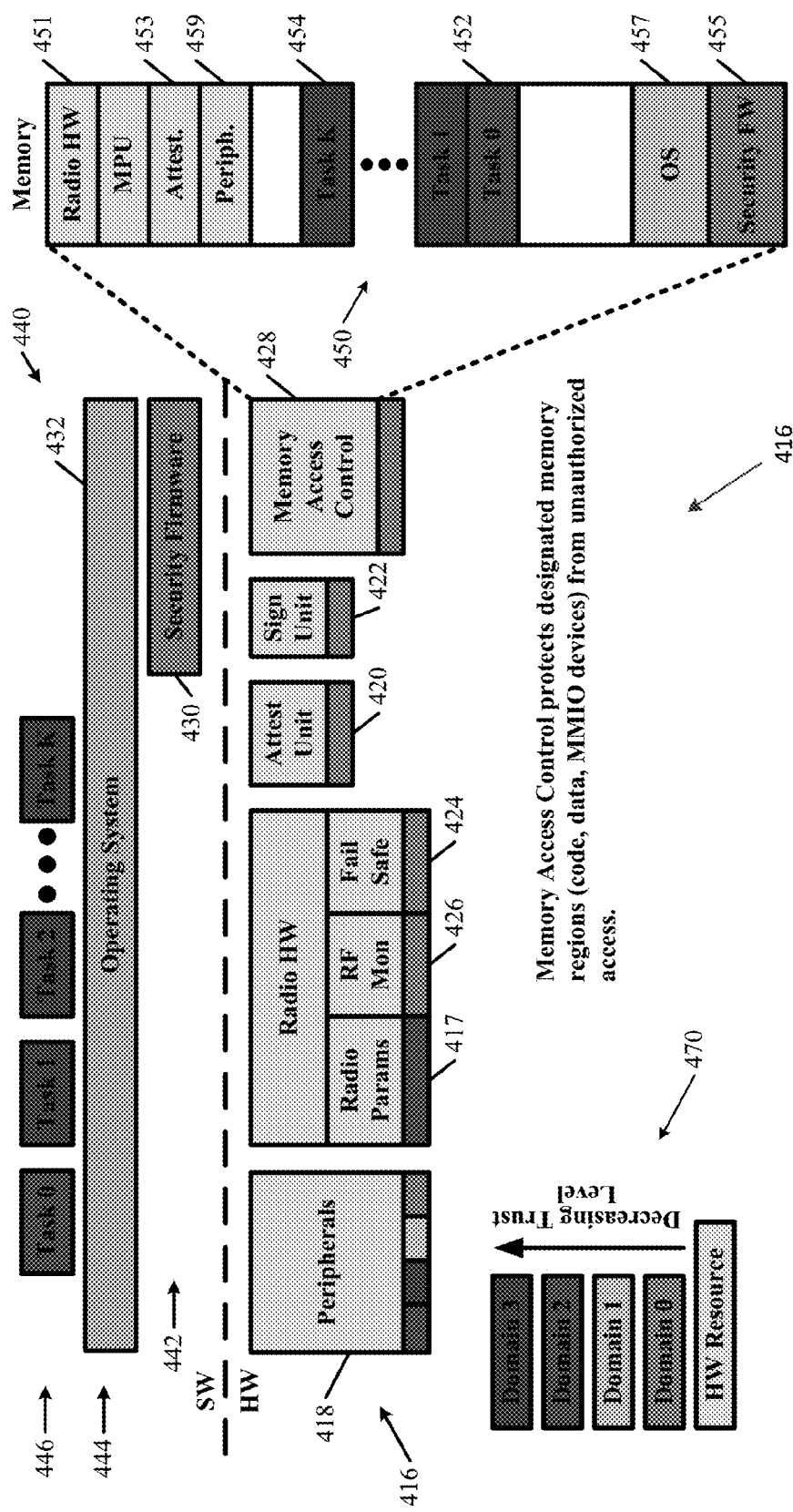
FIG. 4 is a schematic illustration of a software architecture of a multimode wireless radio transceiver, in accordance with some demonstrative embodiments.

Reference is made to FIG. 4, which schematically illustrates a software architecture 414 of a multimode wireless radio transceiver, in accordance with some demonstrative embodiments. For example, radio 114 (FIG. 1) may include software architecture 414.

As shown in FIG. 4, software architecture 414 may be implemented on top of a hardware architecture 416. For example, hardware architecture 416 may perform the functionality of hardware architecture 314 (FIG. 3).

In some demonstrative embodiments, utilizing of software architecture 414 on HW architecture 416 may leverage hardware architecture 416, e.g., as described below.

As shown in FIG. 4, hardware architecture 416 may include a radio hardware 419, e.g., radio hardware 316 (FIG. 3), including a fail-safe unit 424, e.g., fail-safe unit 322 (FIG. 3), and/or an RF monitoring unit 426, e.g., RF monitoring unit 320 (FIG. 3), and one or more radio parameters 417, e.g., radio configuration parameters 132, 134, 136 and/or 138 (FIG. 1).

As shown in FIG. 4, hardware architecture 416 may include one or more peripherals 418, e.g., one or more peripherals of device 102 (FIG. 1), a radio hardware 416, e.g., an attestation unit 420, e.g., attestation unit 330 (FIG. 3), a signing unit 422, e.g., signing unit 332 (FIG. 3), and a memory access control unit 428, e.g., memory access control unit 302 (FIG. 3).

As shown in FIG. 4, software architecture 414 may include a plurality of software modules 440 arranged in hierarchical order. For example, software architecture 414 may include three levels of hierarchy.

As shown in FIG. 4, the plurality of software modules 440 may include a security firmware 430 at a first level of hierarchy 442, an operating system 430 at a second level of hierarchy 444 and one or more tasks, denoted Task 0 to Task K, at a third level of hierarchy 446.

In other embodiments, software architecture 414 may include any other different number of levels of hierarchy, e.g., two levels of hierarchy, or more than three levels of hierarchy.

As shown in FIG. 4, memory access control unit 428 may be configured to control access to a memory space 450 of the radio transceiver including a plurality of memory regions.

As shown in FIG. 4, memory space 450 may include one or more memory regions for a hardware component of hardware architecture 416. For example, memory space 450 may include a memory region 451 for radio hardware 416, a memory region 459 for peripherals 418, a memory region 453 for attestation unit and/or any other memory region for any other hardware component of hardware architecture 416.

As shown in FIG. 4, memory space 450 may include one or more memory regions for software modules 440. For example, memory space 450 may include a memory region 457 for operating system 432, a memory region 455 for security firmware 430, a memory region 452 for Task 0, and/or a memory region 454 for Task 1 to Task K and/or any other memory region to any other software module of software architecture 414.

As shown in FIG. 4, software architecture 414 may be configured to support a plurality of protection domains 470, e.g., four protection domains. For example, software architecture 414 may be configured to support a first protection domain, denoted Domain 0, a second protection domain, denoted Domain 1, a third protection domain, denoted Domain 2, and a fourth protection domain, denoted Domain 3.

In other embodiments, software architecture 414 may be configured to support any other number of protection domains, e.g., three protection domains or more than four domains.

As shown in FIG. 4, the plurality of protection domains 470 may be arranged in order of decreasing trust level, e.g., the first protection domain having the highest privilege and/or trust level.

As shown in FIG. 4, a protection domain of the plurality of protection domains 470 may restrict access of a software module to one or more hardware components of hardware architecture 416 and memory space 450. For example, the first protection domain may give access to all hardware components of hardware architecture 416 and to all regions of memory space 450; the second protection domain may restrict access to peripherals 418 and to a memory region 459 of peripherals 418; the third protection domain may restrict access to memory region 452 of task 0; and/or the fourth protection domain may restrict access to memory region 454 of Task 1 to Task K.

In some demonstrative embodiments, the first protection domain may be designated to a configuration software having a relatively high trust level. For example, the first protection domain may perform the functionality of protection domain 142 (FIG. 1).

As shown in FIG. 4, the first protection domain may be designated to security firmware 430. For example, security firmware 430 may perform the functionality of PDC 112 (FIG. 1).

In some demonstrative embodiments, security firmware 430 may be loaded into RAM 306 (FIG. 3) and may be executed by execution core 302 (FIG. 3).

In some demonstrative embodiments, security firmware 430 may have full read, write, and/or execute access to any HW components of HW architecture 416, e.g., peripherals 418, attestation unit 420, signing unit 422, memory access control unit 428, fail-safe unit 424, e.g., and/or an RF monitoring unit 426.

In some demonstrative embodiments, security firmware 430 may be configured to modify one or more settings of memory access control unit 428 to configure security settings for radio 114 (FIG. 1). For example, security firmware 430 may modify DMA controllers of access control unit 428 according to the designations of protection domains 470.

In some demonstrative embodiments, security firmware 430 may mediate one or more launches of software modules, configuration software and/or any other software having a reduced trust level lower than a trust level of security firmware 430.

In some demonstrative embodiments, security firmware 430 may mediate launce of operating system 432 of radio 114 (FIG. 1), one or more tasks of operating system 432 and/or a context switch of operating system 432.

In some demonstrative embodiments, security firmware 430 may mediate one or more tasks relating to configuration of radio 114 (FIG. 1).

In one example, security firmware 430 may mediate one or more settings of memory access control unit 428, e.g., based on launch policy 220 (FIG. 2) of configuration software 157 (FIG. 1).

In another example, security firmware 430 may mediate one or more signing tasks, attestation tasks and/or secure update tasks. For example, security firmware 430 may perform the task of hash values 126 (FIG. 1) utilizing signing unit 422.

In some demonstrative embodiments, the second domain may be designated to a configuration software having a relatively reduced trust level. For example, the second domain may perform the functionality of protection domain 144 (FIG. 1).

As shown in FIG. 4, the second domain may be designated to operating system 432 of radio 114 (FIG. 1), e.g., an embedded configurable operating system (ECOS).

In some demonstrative embodiments, the second domain may enable operating system 432 to have full read, write, and/or execute access to code and/or data of operating system 432, e.g., memory region 457.

In some demonstrative embodiments, the second domain may enable operating system 432 to have partial read, write, and/or execute access to one or more component of HW architecture 416.

As shown in FIG. 4, operating system 432 may have partial read, write, and/or execute access to one or more peripherals 418, memory region 459 of peripherals 418, and/or one or more radio configuration parameters 419.

For example, operating system 432 may be able to access radio configuration parameter 134 and/or 136 (FIG. 1) of protection domain 144 (FIG. 1).

As shown in FIG. 4, operating system 432 may not be able to read, write and/or access attestation unit 420, signing unit 422, memory access control unit 428, fail-safe unit 424, RF monitoring unit 426, memory regions 451, 453, 455 and/or any other component of HW architecture 414 and/or memory regions of memory space 450, which may be restricted to the first domain, e.g., as described above.

For example, operating system 432 may not be able to access radio configuration parameters 132 (FIG. 1) of protection domain 142 (FIG. 1).

In some demonstrative embodiments, operating system 432 may mediate one or more tasks, launches of software modules, configuration software and/or any other software having a lower trust level, e.g., than a trust level of operating system 432.

In some demonstrative embodiments, security firmware 430 may mediate launch of Task 0 to Task K. For example, the one or more tasks may include one or more tasks of operating system 432 and/or a radio application tasks.

In some demonstrative embodiments, the third and/or fourth protection domains may be designated to a configuration software having a lower level of trust. For example, the third and/or fourth domains may perform the functionality of protection domain 146 (FIG. 1).

In some demonstrative embodiments, the third protection domain may be designated to a configuration software having a lower trust level, which is greater than the trust level of the fourth protection domain and lower than the trust level of the second protection domain.

As shown in FIG. 4, the third protection domain may be designated to Task 0 and may restrict access of Task 0 only to an associated data of Task 0, e.g., memory region 452, and/or only to non-critical hardware peripherals of hardware peripherals 418.

As shown in FIG. 4, Task 0 may have partial read, write, and/or execute access to one or more radio configuration parameters 434.

For example, Task 0 be able to access radio configuration parameter 138 (FIG. 1) of protection domain 146 (FIG. 1); and/or Task 0 may not be able to access radio configuration parameters 132 and/or 134 (FIG. 1) of protection domain 142 (FIG. 1), and/or radio configuration parameters 136 of protection domain 144 (FIG. 1).

As shown in FIG. 4, the fourth protection domain may be designated to Task 1 to Task K and may restrict access of Task 1 to task K only to an associated task data of Task 1 to Task K, e.g., memory region 454, and/or only to non-critical hardware peripherals of hardware peripherals 418.

In some demonstrative embodiments, software architecture 414 may be flexible and may enable any other mapping of software modules 440 to protection domains 470. For example, a software module at the second level of trust may be able to access the first protection domain.

In some demonstrative embodiments, protecting of memory space 450 and isolating the memory regions of memory space 450 from tasks having different protection domain designations may be supported via a loosely coupled memory protection unit (MPU) or a memory management unit (MMU). For example, the MPU and/or the PDU may perform the functionality of PDC 112 (FIG. 1).

In one example, the MPU may prohibit any combination of read, write, and execute access to the regions of memory for tasks, which are not authorized to access the regions of the memory.

In some demonstrative embodiments, the MPU may or may not allow operations in hardware architecture 416 to become visible on an interface of hardware architecture 416. For example, the MPU may generate an MPU fault and will not perform the operation, for example, if the operations become visible and/or if memory space 450 resides in processor ordered memory.

In some demonstrative embodiments, the MPU may block entire access of a software module to memory space 450 to prevent any memory side effects, for example, if memory space 450 includes strongly ordered memory.

In some demonstrative embodiments, utilizing the plurality of protection domains 470 may enable restricting of access of one or more software modules 440 to one or more peripherals of peripherals 418, for example, if the one or more peripherals are utilizing one or more regions of memory space 450.

Figure 5:
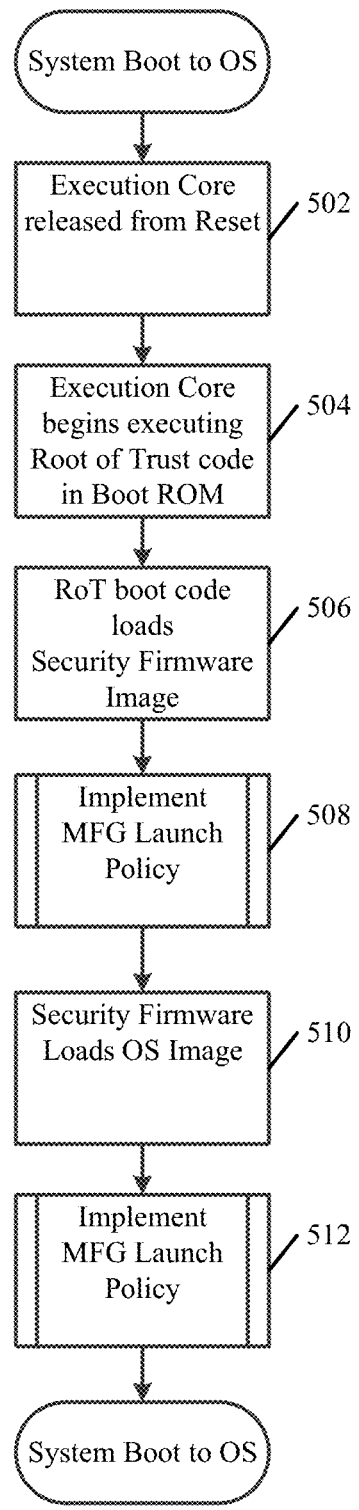
FIG. 5 is a schematic illustration of a method of a system boot of a multimode wireless radio transceiver, in accordance with some demonstrative embodiments.

Reference is made to FIG. 5, which schematically illustrates a method of booting to an operating system (OS) of a multimode wireless radio transceiver, in accordance with some demonstrative embodiments. For example, radio 114 (FIG. 1) may perform one or more of the operations of the method of FIG. 5.

In some demonstrative embodiments, a system boot of the multimode radio transceiver may launch an operating system of the multimode wireless radio transceiver.

In some demonstrative embodiments, the system boot method may establish the RoT sequence mechanism, for example, the RoT sequence may be initiated from the immutable trusted code stored in radio storage 122 (FIG. 1), e.g., boot loader code 371 (FIG. 3), embedded on radio 114 (FIG. 1), and may be completed with the operating system, e.g., operating system 373 (FIG. 3), running on the radio transceiver, e.g., as described in detail below.

As indicated at block 502, the method may include releasing an execution core upon reset of the radio. For example, execution core 302 (FIG. 3) may be released upon resetting of radio 114 (FIG. 1).

As indicated at block 504, the method may include executing of RoT code in Boot ROM. For example, execution core 302 (FIG. 3) may execute boot loader code 371 (FIG. 3) stored in Boot ROM 324 (FIG. 3).

As indicated at block 506, the method may include loading of a security firmware image by the RoT code. For example, execution core 302 (FIG. 3) may execute boot loader code 371 (FIG. 3) to load security firmware 372 (FIG. 3).

As indicated at block 508, the method may include implementing a launch policy of a manufacturer (MFG) of the multimode radio transceiver. For example, PDC 112 (FIG. 1) may implement launch policy 220 (FIG. 2) of boot loader code 371 (FIG. 3), e.g., as described below with reference to FIG. 6.

As indicated at block 510, the method may include loading of an operating system image by the security firmware. For example, execution core 302 (FIG. 3) may execute security firmware 372 (FIG. 3), which loads OS 373 (FIG. 3), e.g., as described above.

As indicated at block 512, the method may include implementing a launch policy of a manufacturer of the multimode radio transceiver. For example, PDC 112 (FIG. 1) may implement launch policy 220 (FIG. 2) of security firmware 372 (FIG. 3), e.g., as described below with reference to FIG. 6.

Figure 6:
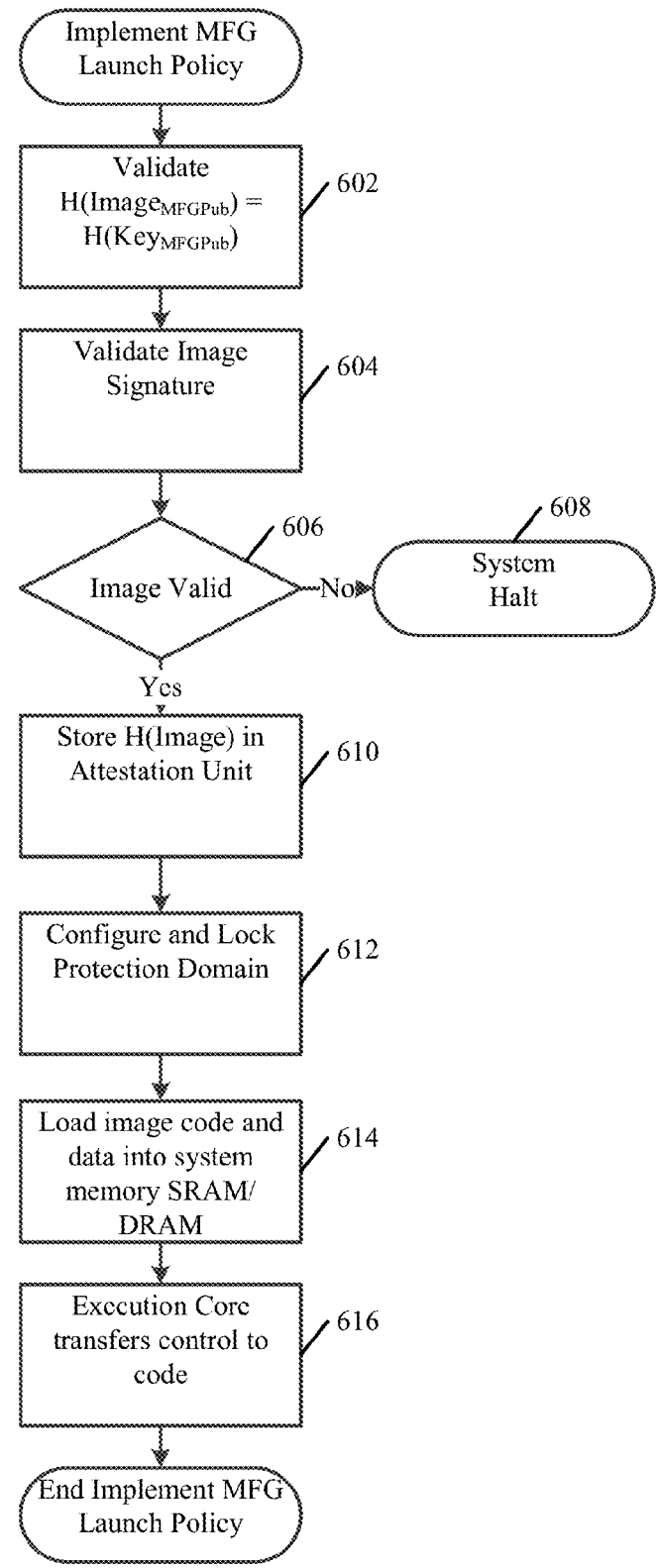
FIG. 6 is a schematic illustration of a method of a launch policy of a manufacturer of a multimode wireless radio transceiver, in accordance with some demonstrative embodiments.

Reference is made to FIG. 6, which schematically illustrates a flow chart of a method of implementing a launch policy of a manufacturer of a multimode wireless radio transceiver, in accordance with some demonstrative embodiments. For example, radio 114 (FIG. 1) may perform one or more of the operations of the method of FIG. 6.

As indicated at block 602, the method may include validating a hash value of a configuration software with a stored verification key. For example, PDC 112 (FIG. 1) may validate the public key in block 240 (FIG. 2) of configuration software 157 (FIG. 1) with verification keys 124 (FIG. 1), e.g., as described above.

As indicated at block 604, the method may include validating a digital signature of the configuration software. For example, PDC 112 (FIG. 1) may validate the digital signature in block 230 (FIG. 2) of configuration software 157 (FIG. 1) with verification keys 124 (FIG. 1), e.g., as described above.

As indicated at block 606, the method may include determining whether or not the image of the configuration software is valid. For example, PDC 112 (FIG. 1) may determine whether or not the digital signature in block 230 (FIG. 2) of configuration software 157 (FIG. 1) is valid, e.g., as described above.

As indicated at block 608, the method may include halting the radio system, e.g., if the configuration software is not valid. For example, PDC 112 (FIG. 1) may generate a hardware trap if configuration software 157 (FIG. 1) is not valid, e.g., as described above.

In some demonstrative embodiments, a predefined fallback configuration software image may be loaded in a highly protected domain to enable a recovery of the radio system, e.g., when configuration software 157 (FIG. 1) is not valid and PDC 112 (FIG. 1) halts radio 114 (FIG. 1).

As indicated at block 610, the method may include storing a hash value of the configuration software in an attestation unit, e.g., if the configuration software is valid. For example, PDC 112 (FIG. 1) may store hash values 126 (FIG. 1) in attestation unit 330 (FIG. 3), for example, if configuration software 157 (FIG. 1) is valid, e.g., as described above.

As indicated at block 612, the method may include configuring and locking of a protection domain for the configuration software according to a launch policy of the configuration software. For example, PDC 112 (FIG. 1) may restrict access of configuration software 157 (FIG. 1) to protection domain 142 (FIG. 1) according to the launch policy in block 220 (FIG. 2), e.g., as described above.

In some demonstrative embodiments, the configuring and locking of the protection domain may be set until the radio system resets. For example, PDC 112 (FIG. 1) may restrict access of configuration software 157 (FIG. 1) to protection domain 142 (FIG. 1) until radio 114 (FIG. 1) is reset.

As indicated at block 614, the method may include loading image code and data into a memory of the radio. For example, PDC 112 (FIG. 1) may load code and/or data in block 210 (FIG. 2) of configuration software 157 (FIG. 1) into NVM storage 359 (FIG. 3), e.g., as described above.

As indicated at block 616, the method may include transferring control to the code of the configuration software. For example, execution core 302 (FIG. 3) may execute the code in block 210 (FIG. 2), e.g., as described above.

Figure 7:
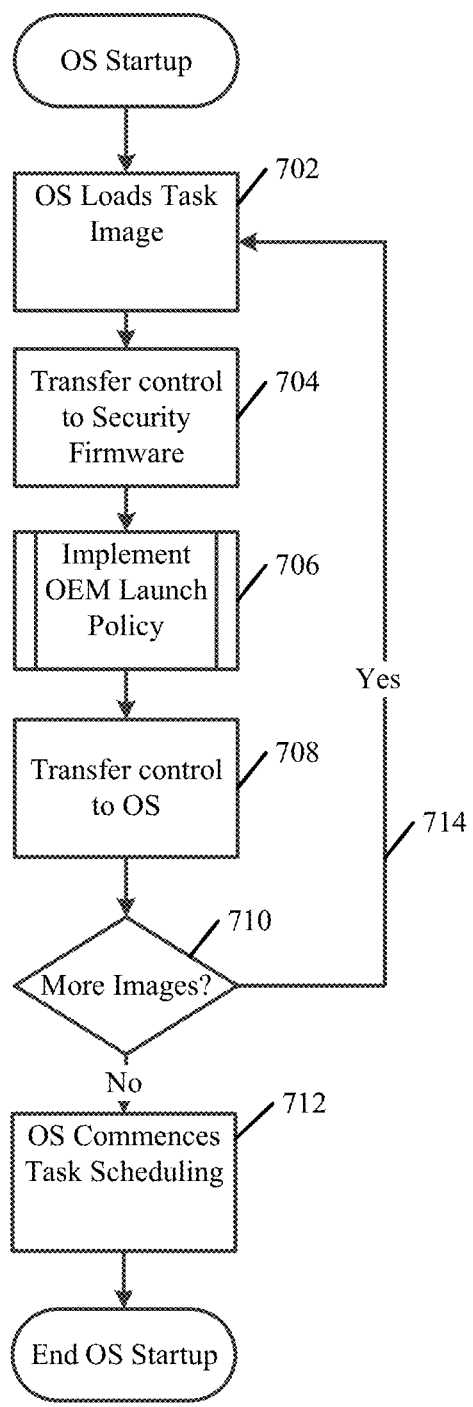
FIG. 7 is a schematic illustration of a method of an operating system (OS) startup of a multimode wireless radio transceiver, in accordance with some demonstrative embodiments.

Reference is made to FIG. 7, which schematically illustrates a method of launching tasks to configure a multimode radio transceiver, in accordance with some demonstrative embodiments. For example, radio 114 (FIG. 1) may perform one or more of the operations of the method of FIG. 7.

As indicated at block 702, the method may include loading of a task image of a configuration software by an operating system (OS) of the radio transceiver. For example, OS 432 (FIG. 4) may load Task 0 to Task K (FIG. 4).

As indicated at block 704, the method may include transferring control to security firmware. For example, OS 432 (FIG. 4) may transfer control to security firmware 430 (FIG. 4).

As indicated at block 706, the method may include implementing a launch policy of a vendor, e.g., an OEM, of the configuration software. For example, PDC 112 (FIG. 1) may implement launch policy 220 (FIG. 2), e.g., as described below with reference to FIG. 8.

As indicated at block 708, the method may include transferring control to the OS. For example, security firmware image 430 (FIG. 4) may transfer control to OS 432 (FIG. 4).

As indicated at block 710, the method may include determining whether or not there are more configuration software images to be loaded. For example, execution core 302 (FIG. 3) may determine whether or not there are more configuration software images stored in NVM 359 (FIG. 3) to be loaded, e.g., as described above.

As indicated by arrow 714, the method may include loading of another task image of a configuration software by the OS, for example, if there is another task image, e.g., as described above with reference to block 702.

As indicated at block 712, the method may include commencing task scheduling of the loaded tasks images by the OS. For example, OS 432 (FIG. 4) may commence task scheduling of Tasks 0 to Task K (FIG. 4), e.g., as described above.

In some demonstrative embodiments, PDC 112 (FIG. 1) may restrict access of the loaded task to a specified protection domain according to the OEM launch policy.

In some demonstrative embodiments, PDC 112 (FIG. 1) may be configured to perform any suitable action, for example, when the loaded task violates its access control rights. For example, PDC 112 (FIG. 1) may terminate the task, halt the radio system or perform any other operation, for example, if the loaded task violates access control rights of the loaded task, e.g., according to the loaded task launch policy.

In one example, the loaded task may be allowed to run in a highly secure domain, e.g., a task having minimal privileges, for example, if the task image is not valid, e.g., when the validation process implemented at block 706 fails.

Figure 8:
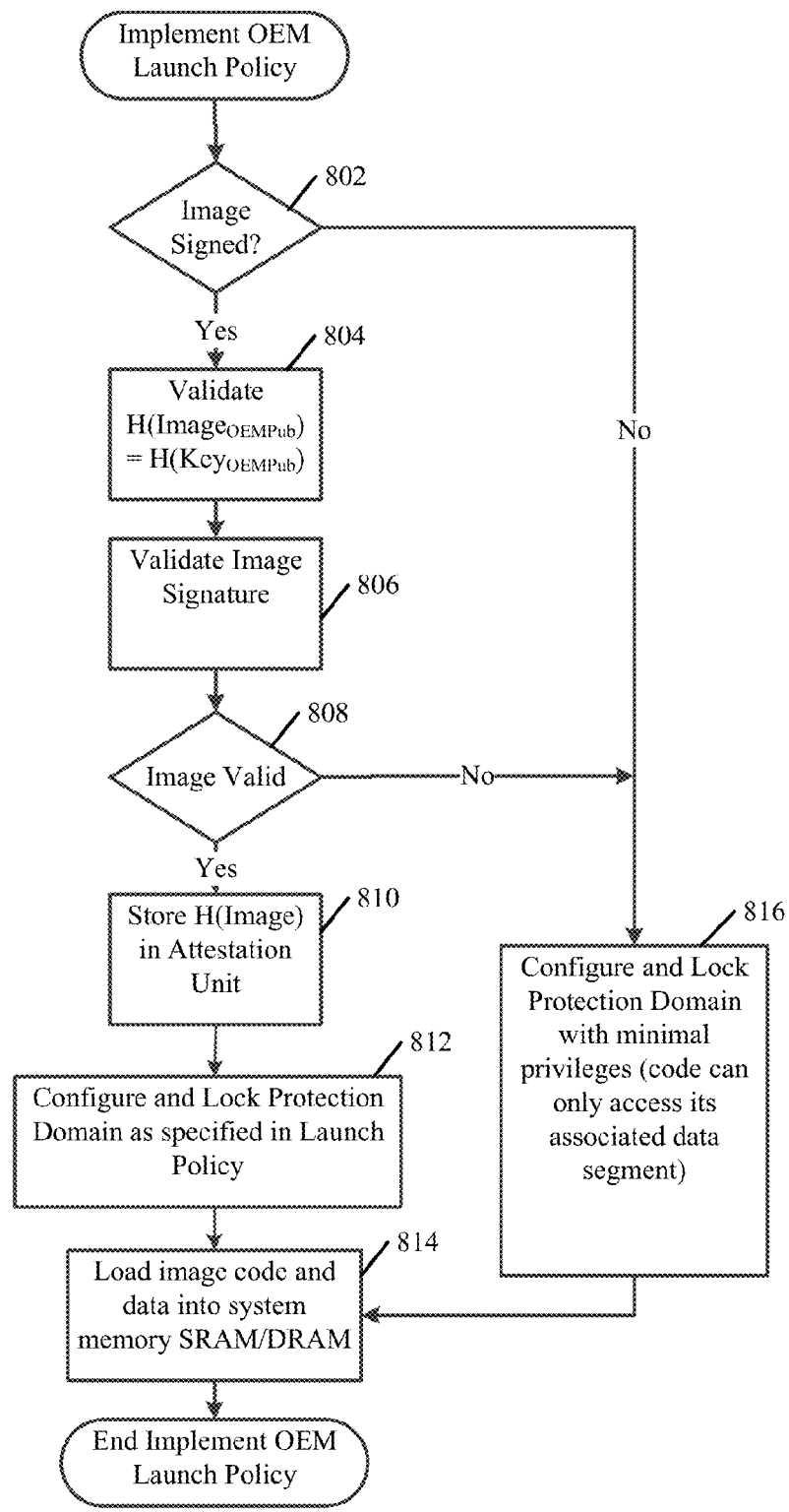
FIG. 8 is a schematic illustration of a method of a launch policy of a vendor of a configuration software, in accordance with some demonstrative embodiments.

Reference is made to FIG. 8, which schematically illustrates a flow chart of a method of implementing a launch policy of a vendor, e.g., an OEM, of a configuration software to configure a multimode wireless radio transceiver, in accordance with some demonstrative embodiments. For example, radio 114 (FIG. 1) may perform one or more of the operations of the method of FIG. 8.

As indicated at block 802, the method may include determining whether or not the configuration software is signed. For example, PDC 112 (FIG. 1) may determine whether or not configuration software 157 (FIG. 1) includes the digital signature in block 230 (FIG. 2), e.g., as described above.

As indicated at block 804, the method may include validating a hash value of the configuration software with a stored hash value, e.g., if the configuration software is signed. For example, PDC 112 (FIG. 1) may validate the public key in block 240 (FIG. 2) of configuration software 157 (FIG. 1) with verification keys 124 (FIG. 1) if configuration software 157 (FIG. 1) is valid.

As indicated at block 806, the method may include validating the signature of the configuration software. For example, PDC 112 (FIG. 1) may validate digital signature 230 (FIG. 2) of configuration software 157 (FIG. 1) with verification keys 124 (FIG. 1), e.g., as described above.

As indicated at block 808, the method may include determining whether or not the configuration software is valid. For example, PDC 112 (FIG. 1) may determine whether or not the digital signature in block 230 (FIG. 2) of configuration software 157 (FIG. 1) is valid, e.g., as described above.

As indicated at block 810, the method may include storing a hash value of the configuration software in an attestation unit, e.g., if the configuration software is valid. For example, PDC 112 (FIG. 1) may store the hash value 126 (FIG. 1) of configuration software 157 (FIG. 1) in attestation unit 330 (FIG. 3), for example, if configuration software 157 (FIG. 1) is valid, e.g., as described above.

As indicated at block 812, the method may include configuring and locking of a protection domain for the configuration software according to a launch policy of the configuration software. For example, PDC 112 (FIG. 1) may restrict access of configuration software 157 (FIG. 1) to protection domain 142 (FIG. 1) according to the launch policy in block 220 (FIG. 2), e.g., as described above.

As indicated at block 814, the method may include loading image code and data into a memory of the multimode radio. For example, PDC 112 (FIG. 1) may load the code and/or the data in block 210 (FIG. 2) of configuration software 157 (FIG. 1) into NVM storage 359 (FIG. 3), e.g., as described above.

As indicated at block 816, the method may include configuring and locking a highly protected domain for the configuration software, e.g., if the configuration software is not signed and/or not valid. For example, PDC 112 (FIG. 1) may restrict access of configuration software 157 (FIG. 1) to protection domain 146 (FIG. 1) if configuration software 157 (FIG. 1) is not valid and/or not signed, e.g., as described above.

In some demonstrative embodiments, restricting access of configuration software 157 (FIG. 1) to the highly protected domain may enable configuration software 157 (FIG. 1) to access only data segments of configuration software 157 (FIG. 1), and not any other data segment of resources 130 (FIG. 1).

Figures 9, 10, 11:
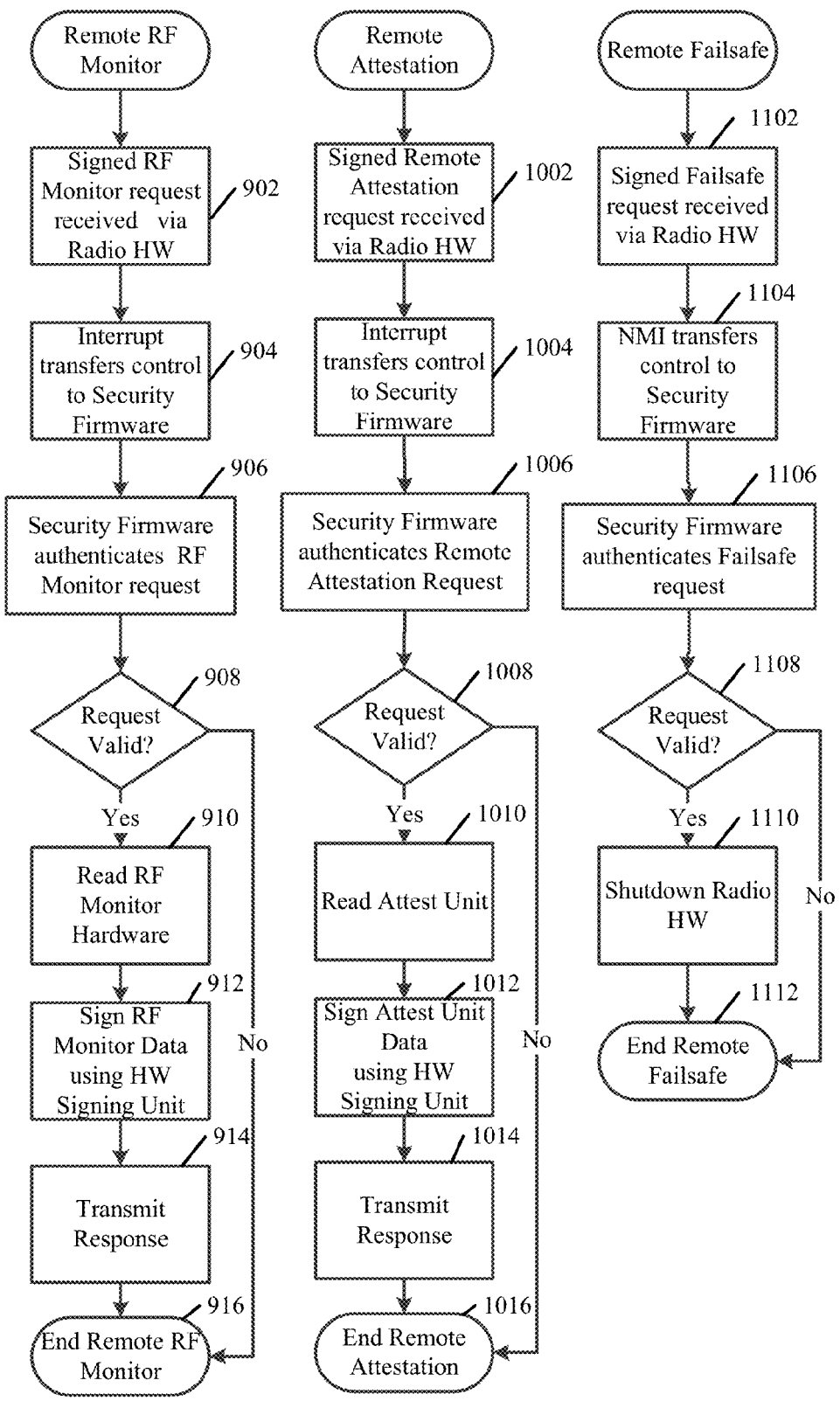
FIG. 9 is a schematic illustration of a method of a remote monitoring of a multimode wireless radio transceiver, in accordance with some demonstrative embodiments.
FIG. 10 is a schematic illustration of a method of a remote attestation of a multimode wireless radio transceiver, in accordance with some demonstrative embodiments.
FIG. 11 is a schematic illustration of a method of a remote controlling of a multimode wireless radio transceiver, in accordance with some demonstrative embodiments.

Reference is made to FIG. 9, which schematically illustrates a method of a remote monitoring of a multimode wireless radio transceiver, in accordance with some demonstrative embodiments. For example, radio 114 (FIG. 1) may perform one or more of the operations of the method of FIG. 9.

In some demonstrative embodiments, the method may enable a remote device, e.g., remote device 150 (FIG. 1), to monitor RF transmission from the multimode radio transceiver, e.g., as described below.

As indicated at block 902, the method may include receiving a signed RF monitor request message. For example, radio 114 (FIG. 1) may receive from remote device 150 (FIG. 1) the monitor request message, e.g., as described above.

As indicated at block 904, the method may include transferring control to a security firmware by an interrupt procedure. For example, wireless communication unit 110 (FIG. 1) may transfer control to PDC 112 (FIG. 1) upon receiving the RF monitor request message.

As indicated at block 906, the method may include authenticating the digital signature of the RF monitor request message. For example, PDC 112 (FIG. 1) may authenticate the digital signature of the RF monitor request message with verification keys 124 (FIG. 1), e.g., as described above.

As indicated at block 908, the method may include determining whether or not the RF monitor request is valid. For example, PDC 112 (FIG. 1) may determine whether or not the RF monitor request is valid, e.g., as described above.

As indicated at block 910, the method may include reading data from an RF monitoring unit. For example, RF monitor 160 (FIG. 1) may read values of the dynamic parameters of radio 114 (FIG. 1), e.g., as described above.

As indicated at block 912, the method may include signing the data of the RF monitoring unit by a signing unit. For example, signing unit 332 (FIG. 1) may sign the values of the dynamic parameters of radio 114 (FIG. 1).

As indicated at block 914, the method may include transferring an RF monitor response message to the remote device. For example, RF monitor 160 (FIG. 1) may control wireless communication unit 110 (FIG. 1) to transfer the values of the dynamic parameters of radio 114 (FIG. 1) to remote device 150 (FIG. 1), e.g., as described above.

As indicated at block 916, the method may include completing the method of remote monitoring, for example, upon transferring the RF monitor response message and/or if the RF monitor request message is not valid. For example, RF monitor 160 (FIG. 1) may not transfer the RF monitor response message to device 150 (FIG. 1), e.g., if the RF monitor request message is not valid.

Reference is made to FIG. 10, which schematically illustrates a flow chart of a method of a remote attestation of a multimode radio transceiver, in accordance with some demonstrative embodiments. For example, radio 114 (FIG. 1) may perform one or more of the operations of the method of FIG. 10.

In some demonstrative embodiments, the method may enable a remote device, e.g., remote device 150 (FIG. 1), to query the multimode radio transceiver and to receive information on one or more configuration software, which are loaded into the multimode radio transceiver, e.g., as described below.

In some demonstrative embodiments, the method may include signing hash values in an attestation unit during the system boot and the OS boot, e.g., as described above with reference to FIG. 5. For example, signing unit 332 (FIG. 3) may sign hash values 126 (FIG. 1) of configuration software 157 (FIG. 1), which are stored in attestation unit 330 (FIG. 3) during the boot of radio 114 (FIG. 1) and or during loading the OS of radio 114 (FIG. 1).

As indicated at block 1002, the method may include receiving a signed attestation request message. For example, radio 114 (FIG. 1) may receive from remote device 150 (FIG. 1) the attestation request message, e.g., as described above.

As indicated at block 1004, the method may include transferring control to a security firmware by an interrupt procedure. For example, wireless communication unit 110 (FIG. 1) may transfer control to PDC 112 (FIG. 1) upon receiving the attestation request message.

As indicated at block 1006, the method may include authenticating the digital signature of the attestation request message. For example, PDC 112 (FIG. 1) may authenticate the digital signature of the attestation request message with verification keys 124 (FIG. 1), e.g., as described above.

As indicated at block 1008, the method may include determining whether or not the RF monitor request is valid. For example, PDC 112 (FIG. 1) may determine whether or not the attestation request message is valid, e.g., as described above.

As indicated at block 1010, the method may include reading data from an attestation unit. For example, PDC 112 (FIG. 1) may read hash values 126 (FIG. 1) from attestation unit 330 (FIG. 3), e.g., as described above.

As indicated at block 1012, the method may include signing the data stored in the attestation unit. For example, signing unit 332 (FIG. 1) may sign hashes values 126 (FIG. 1) stored in attestation unit 330 (FIG. 3).

As indicated at block 1014, the method may include transferring an attestation response message to the remote device. For example, PDC 112 (FIG. 1) may control wireless communication unit 110 (FIG. 1) to transfer hash values 126 (FIG. 1) to remote device 150 (FIG. 1), e.g., as described above.

As indicated at block 1016, the method may include completing the method of remote attestation, for example, upon transferring the attestation response message and/or if the attestation request message is not valid. For example, PDC 112 (FIG. 1) may not transfer the attestation response message to remote device 150 (FIG. 1) if the attestation request message is not valid.

Reference is made to FIG. 11, which schematically illustrates a flow chart of a method of a remote controlling of a multimode radio transceiver, in accordance with some demonstrative embodiments. For example, radio 114 (FIG. 1) may perform one or more of the operations of the method of FIG. 11.

In some demonstrative embodiments, the method may enable a remote device, e.g., remote device 150 (FIG. 1), to remotely shutdown one or more hardware components of the radio transceiver, for example, if the radio transceiver is not operating according to predefined regulations, e.g., FCC regulations, and/or upon any other malicious behavior of the radio transceiver, e.g., as described below.

As indicated at block 1102, the method may include receiving a signed failsafe request message. For example, radio 114 (FIG. 1) may receive from remote device 150 (FIG. 1) the failsafe message, e.g., as described above.

As indicated at block 1104, the method may include transferring control to a security firmware, for example, by an interrupt procedure. For example, wireless communication unit 111 (FIG. 1) may transfer control to PDC 112 (FIG. 1) upon receiving the failsafe message.

As indicated at block 1106, the method may include authenticating the digital signature of the failsafe message. For example, PDC 112 (FIG. 1) may authenticate the digital signature of the failsafe message with verification keys 124 (FIG. 1), e.g., as described above.

As indicated at block 1108, the method may include determining whether or not the failsafe message is valid. For example, PDC 112 (FIG. 1) may determine whether or not the failsafe message is valid, e.g., as described above.

As indicated at block 1110, the method may include shutting down one or more hardware components of the radio transceiver. For example, failsafe controller 162 (FIG. 1) may shut down one or more components of hardware components 116 (FIG. 1), e.g., as described above.

As indicated at block 1116, the method may include completing the method of remote failsafe, for example, upon shutting down the hardware components and/or if the failsafe message is not valid. For example, failsafe controller 162 (FIG. 1) may not shut down one or hardware components 116 (FIG. 1), if the failsafe message is not valid.

Figure 12:
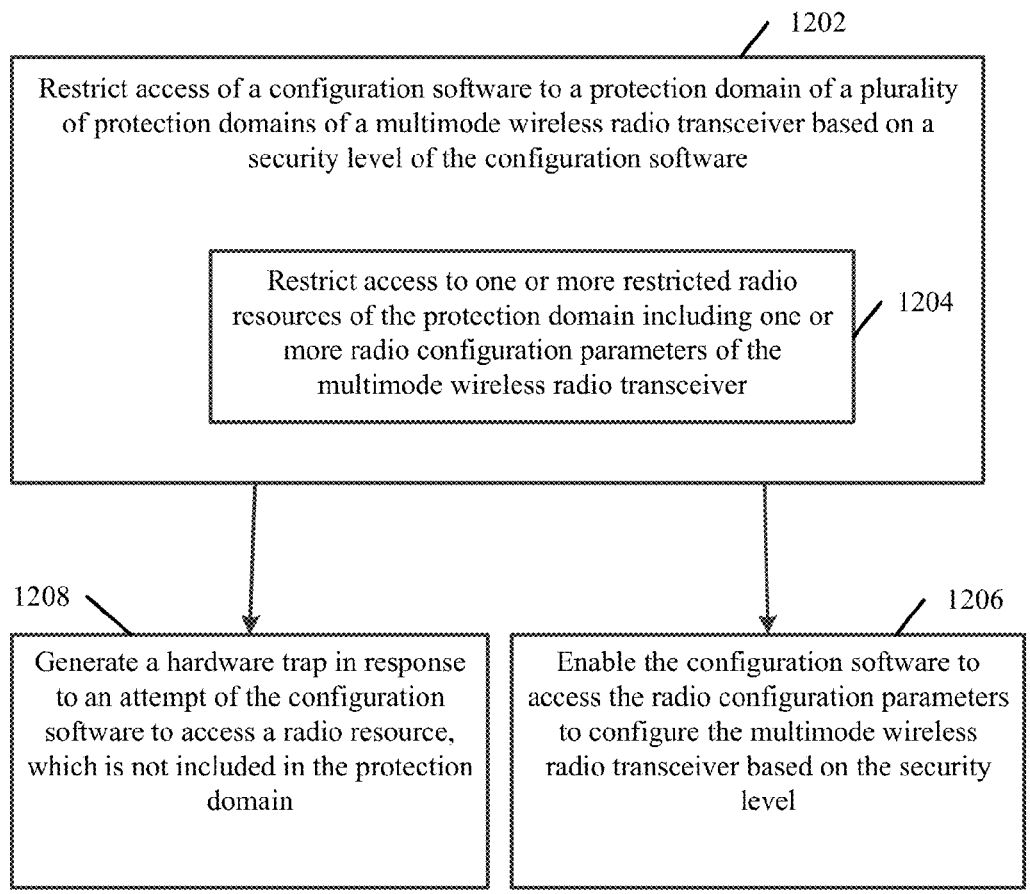
FIG. 12 is a schematic illustration of a method of protecting domains of a multimode wireless radio transceiver, in accordance with some demonstrative embodiments.

Reference is made to FIG. 12, which schematically illustrates a method of protecting domains of a multimode wireless radio transceiver, in accordance with some demonstrative embodiments. In some demonstrative embodiments, one or more of the operations of the method of FIG. 12 may be performed by any suitable wireless communication system, e.g., system 100 (FIG. 1), a wireless communication device, e.g., device 102 (FIG. 1), a protection domain controller, e.g., PDC 112 (FIG. 1); a hardware architecture, e.g., hardware architecture 314 (FIG. 3), a software architecture, e.g., software architecture 414 (FIG. 4), and/or a multimode wireless radio transceiver, e.g., radio 114 (FIG. 1).

As indicated at block 1202, the method may include restricting access of a configuration software to a protection domain of a plurality of protection domains of a multimode wireless radio transceiver based on a security level of the configuration software. For example, PDC 112 (FIG. 1) may restrict access of configuration software 157 (FIG. 1) to protection domain 146 (FIG. 1) based on the security level of configuration software 157 (FIG. 1), e.g., as described above.

As indicated at block 1204, restricting access of the configuration software to the protection domain may include restricting access to one or more restricted radio resources of the protection domain including one or more radio configuration parameters of the multimode wireless radio transceiver. For example, PDC 112 (FIG. 1) may restrict access of configuration software 157 (FIG. 1) to configuration parameters 138 (FIG. 1) of protection domain 146 (FIG. 1), e.g., as described above.

As indicated at block 1206, the method may include enabling the configuration software to access the radio configuration parameters to configure the multimode wireless radio transceiver based on the security level. For example, PDC 112 (FIG. 1) may enable configuration software 157 (FIG. 1) to access configuration parameters 138 (FIG. 1) to configure radio 114 (FIG. 1) based on the security level configuration software 157 (FIG. 1), e.g., as described above.

As indicated at block 1208, the method may include generating a hardware trap in response to an attempt of the configuration software to access a radio resource, which is not included in the protection domain. For example, PDC 112 (FIG. 1) may generate a hardware trap in response to an attempt of configuration software 157 (FIG. 1) to access configuration parameters 132 (FIG. 1), which is not included in protection domain 142 (FIG. 1), e.g., as described above.

Figure 13:
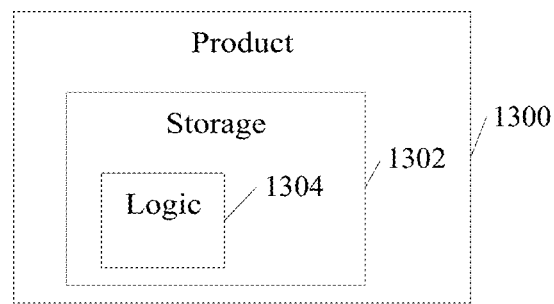
FIG. 13 is a schematic illustration of a product of manufacture, in accordance with some demonstrative embodiments.

Reference is made to FIG. 13, which schematically illustrates a product of manufacture 1300, in accordance with some demonstrative embodiments. Product 1300 may include a non-transitory machine-readable storage medium 1302 to store logic 1304, which may be used, for example, to perform at least part of the functionality of device 102 (FIG. 1), wireless communication unit 110 (FIG. 1), PDC 112 (FIG. 1), hardware architecture 314 (FIG. 3), software architecture 414 (FIG. 4), and/or radio 114 (FIG. 1), and/or to perform one or more operations of the method of FIGS. 5, 6, 7, 8, 9, 10, 11, and/or 12. The phrase "non-transitory machine-readable medium" is directed to include all computer-readable media, with the sole exception being a transitory propagating signal.

In some demonstrative embodiments, product 1300 and/or machine-readable storage medium 1302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a protection domain controller (PDC) to restrict access of a configuration software to a protection domain of a plurality of protection domains of a multimode wireless radio transceiver based on a security level of the configuration software, wherein the protection domain includes one or more radio configuration parameters of the multimode wireless radio transceiver.

Example 2 includes the subject matter of Example 1 and optionally, wherein the PDC is to enable the configuration software to access the radio configuration parameters to configure the multimode wireless radio transceiver based on the security level.

Example 3 includes the subject matter of Example 1 or 2 and optionally, wherein the configuration software includes a launch policy, and wherein the PDC is to determine the protection domain based on the launch policy.

Example 4 includes the subject matter of Example 3 and optionally, wherein the configuration software includes a code to configure the multimode radio transceiver, data to configure the radio configuration parameters, a public verification key, and a digital signature verifying the code and the data.

Example 5 includes the subject matter of Example 4 and optionally, wherein the PDC is to validate the digital signature with one or more stored verification keys.

Example 6 includes the subject matter of any one of Examples 1-5 and optionally, wherein the plurality of protection domains includes at least three different protection domains.

Example 7 includes the subject matter of Example 6 and optionally, wherein the three protection domains include an unprivileged protection domain in which no certification is required to access one or more radio resources of the unprivileged protection domain, a reduced privilege protection domain in which one or more internal certifications are required to access one or more radio resources of the reduced privilege domain, and a privileged protection domain in which one or more external certifications are required to access one or more radio resources of the privileged protection domain.

Example 8 includes the subject matter of any one of Examples 1-7 and optionally, wherein the PDC is to generate a hardware trap in response to an attempt of the configuration software to access a radio resource, which is not included in the protection domain.

Example 9 includes the subject matter of any one of Examples 1-8 and optionally, comprising a radio frequency (RF) monitor to monitor one or more dynamic parameters of the multimode wireless radio transceiver, wherein the dynamic parameters relate to RF transmissions of the multimode wireless radio transceiver.

Example 10 includes the subject matter of Example 9 and optionally, wherein the RF monitor is to generate an alert message if at least one dynamic parameter of the one or more dynamic parameters exceeds a predefined parameter threshold.

Example 11 includes the subject matter of Example 10 and optionally, wherein the PDC is to control the multimode wireless radio transceiver to transmit the alert message to a remote device.

Example 12 includes the subject matter of Example 11 and optionally, comprising a failsafe controller to shutdown one or more hardware (HW) components of the multimode wireless radio transceiver in response to a failsafe message received from the remote device, wherein the failsafe message is in response to the alert message.

Example 13 includes the subject matter of any one of Examples 9-12 and optionally, wherein the PDC is to control the multimode wireless radio transceiver to transmit values of the one or more dynamic parameters to a remote device in response to a monitor request message received from the remote device.

Example 14 includes the subject matter of any one of Examples 9-13 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 15 includes the subject matter of Example 9 and optionally, comprising a failsafe controller to shutdown one or more Hardware (HW) components of the multimode wireless radio transceiver if at least one of the dynamic parameters exceeds a predefined dynamic parameter.

Example 16 includes the subject matter of any one of Examples 1-11 and optionally, comprising a failsafe controller to shutdown one or more Hardware (HW) components of the multimode wireless radio transceiver in response to a failsafe message received from a remote device.

Example 17 includes the subject matter of any one of Examples 1-16 and optionally, wherein the PDC is to store a hash value representing the configuration software and to transmit the hash value to a remote device in response to an attestation request message received from the remote device.

Example 18 includes the subject matter of any one of Examples 1-17 and optionally, wherein the PDC is embedded on the multimode wireless radio transceiver.

Example 19 includes an apparatus comprising a radio frequency (RF) monitor to monitor one or more dynamic parameters relating to RF transmissions of a multimode wireless radio transceiver and to transmit values of the one or more dynamic parameters to a remote device.

Example 20 includes the subject matter of Example 19 and optionally, wherein the RF monitor is to control the wireless radio transceiver to transmit the values of the one or more dynamic parameters in response to a monitor request message received from the remote device.

Example 21 includes the subject matter of Example 19 or 20 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 22 includes the subject matter of any one of Examples 19-21 and optionally, comprising a failsafe controller to shutdown one or more HW components of the multimode wireless radio transceiver if at least one of the dynamic parameters exceeds a predefined dynamic parameter.

Example 23 includes the subject matter of any one of Examples 19-21 and optionally, comprising a failsafe controller to shutdown one or more HW components of the multimode wireless radio transceiver in response to a failsafe message received from the remote device.

Example 24 includes the subject matter of any one of Examples 19-23 and optionally, wherein the RF monitor is embedded on the multimode wireless radio transceiver.

Example 25 includes the subject matter of any one of Examples 19-24 and optionally, wherein the RF monitor is to generate an alert message if at least one dynamic parameter of the one or more dynamic parameters exceeds a predefined parameter.

Example 26 includes the subject matter of Example 25 and optionally, wherein the RF monitor is to control the multimode wireless radio transceiver to transmit the alert message to the remote device.

Example 27 includes the subject matter of Example 26 and optionally, comprising a failsafe controller to shutdown one or more hardware (HW) components of the multimode wireless radio transceiver in response to a failsafe message received from the remote device, wherein the failsafe message is in response to the alert message.

Example 28 includes the subject matter of any one of Examples 25-27 and optionally, wherein the RF monitor is to provide the alert message to a protection domain controller (PDC).

Example 29 includes the subject matter of Example 28 and optionally, wherein the PDC is to restrict access of a configuration software to a protection domain of a plurality of protection domains of the multimode wireless radio transceiver based on a security level of the configuration software, wherein the protection domain includes one or more radio configuration parameters of the multimode wireless radio transceiver.

Example 30 includes an apparatus comprising a failsafe controller to control an operation of a plurality of hardware (HW) components of a multimode wireless radio transceiver, the failsafe controller is to shutdown one or more HW components of the plurality of HW components based on a failsafe message received from a remote device.

Example 31 includes the subject matter of Example 30 and optionally, comprising a radio frequency (RF) monitor to monitor one or more dynamic parameters relating to RF transmissions of a multimode wireless radio transceiver.

Example 32 includes the subject matter of Example 31 and optionally, wherein the RF monitor is to generate an alert message if at least one dynamic parameter of the one or more dynamic parameters exceeds a predefined parameter.

Example 33 includes the subject matter of Example 32 and optionally, wherein the multimode wireless radio transceiver is to transmit the alert message to the remote device.

Example 34 includes the subject matter of Example 33 and optionally, wherein the failsafe message is in response to the alert message.

Example 35 includes the subject matter of any one of Examples 31-34 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 36 includes the subject matter of any one of Examples 31-35 and optionally, wherein the failsafe controller is to shutdown the one or more HW components of the multimode wireless radio transceiver if at least one of the dynamic parameters exceeds a predefined dynamic parameter.

Example 37 includes the subject matter of any one of Examples 30-36 and optionally, wherein the failsafe controller is embedded on the multimode wireless radio transceiver.

Example 38 includes the subject matter of any one of Examples 30-37 and optionally, comprising a protection domain controller (PDC) to restrict access of a configuration software to a protection domain of a plurality of protection domains of the multimode wireless radio transceiver based on a security level of the configuration software, wherein the protection domain includes one or more radio configuration parameters of the multimode wireless radio transceiver.

Example 39 includes a system comprising a wireless communication device including at least one antenna; a multimode wireless radio transceiver; and a protection domain controller (PDC) to restrict access of a configuration software to a protection domain of a plurality of protection domains of the multimode wireless radio transceiver based on a security level of the configuration software, wherein the protection domain includes one or more radio configuration parameters of the multimode wireless radio transceiver.

Example 40 includes the subject matter of Example 39 and optionally, wherein the PDC is to enable the configuration software to access the radio configuration parameters to configure the multimode wireless radio transceiver based on the security level.

Example 41 includes the subject matter of Example 39 or 40 and optionally, wherein the configuration software includes a launch policy, and wherein the PDC is to determine the protection domain based on the launch policy.

Example 42 includes the subject matter of Example 41 and optionally, wherein the configuration software includes a code to configure the multimode radio transceiver, data to configure the radio configuration parameters, a public verification key, and a digital signature verifying the code and the data.

Example 43 includes the subject matter of Example 42 and optionally, wherein the PDC is to validate the digital signature with one or more stored verification keys.

Example 44 includes the subject matter of any one of Examples 39-43 and optionally, wherein the plurality of protection domains includes at least three different protection domains.

Example 45 includes the subject matter of Example 44 and optionally, wherein the three protection domains include an unprivileged protection domain in which no certification is required to access one or more radio resources of the unprivileged protection domain, a reduced privilege protection domain in which one or more internal certifications are required to access one or more radio resources of the reduced privilege protection domain, and a privileged protection domain in which one or more external certifications are required to access one or more radio resources of the privileged protection domain.

Example 46 includes the subject matter of any one of Examples 39-45 and optionally, wherein the PDC is to generate a hardware trap in response to an attempt of the configuration software to access a radio resource, which is not included in the protection domain.

Example 47 includes the subject matter of any one of Examples 39-46 and optionally, comprising a radio frequency (RF) monitor to monitor one or more dynamic parameters of the multimode wireless radio transceiver, wherein the dynamic parameters relate to RF transmissions of the multimode wireless radio transceiver.

Example 48 includes the subject matter of Example 47 and optionally, wherein the RF monitor is to generate an alert message if at least one dynamic parameter of the one or more dynamic parameters exceeds a predefined parameter threshold.

Example 49 includes the subject matter of Example 48 and optionally, wherein the PDC is to control the multimode wireless radio transceiver to transmit the alert message to a remote device.

Example 50 includes the subject matter of Example 49 and optionally, wherein the wireless communication device comprises a failsafe controller to shutdown one or more hardware (HW) components of the multimode wireless radio transceiver in response to a failsafe message received from the remote device, wherein the failsafe message is in response to the alert message.

Example 51 includes the subject matter of any one of Examples 47-50 and optionally, wherein the PDC is to control the multimode wireless radio transceiver to transmit values of the one or more dynamic parameters to a remote device in response to a monitor request message received from the remote device.

Example 52 includes the subject matter of any one of Examples 47-51 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 53 includes the subject matter of Example 47 and optionally, wherein the wireless communication device comprises a failsafe controller to shutdown one or more Hardware (HW) components of the multimode wireless radio transceiver if at least one of the dynamic parameters exceeds a predefined dynamic parameter.

Example 54 includes the subject matter of any one of Examples 39-49 and optionally, wherein the wireless communication device comprises a failsafe controller to shutdown one or more Hardware (HW) components of the multimode wireless radio transceiver in response to a failsafe message received from a remote device.

Example 55 includes the subject matter of any one of Examples 39-54 and optionally, wherein the PDC is to store a hash value representing the configuration software and to transmit the hash value to a remote device in response to an attestation request message received from the remote device Example 56 includes the subject matter of any one of Examples 39-55 and optionally, wherein the PDC is embedded on the multimode wireless radio transceiver.

Example 57 includes a system comprising a wireless communication device including at least one antenna; a multimode wireless radio transceiver; and a radio frequency (RF) monitor to monitor one or more dynamic parameters relating to RF transmissions of the multimode wireless radio transceiver and to transmit values of the one or more dynamic parameters to a remote device.

Example 58 includes the subject matter of Example 57 and optionally, wherein the RF monitor is to control the wireless radio transceiver to transmit the values of the one or more dynamic parameters in response to a monitor request message received from the remote device.

Example 59 includes the subject matter of Example 57 or 58 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 60 includes the subject matter of any one of Examples 57-59 and optionally, wherein the wireless communication device comprises a failsafe controller to shutdown one or more HW components of the multimode wireless radio transceiver if at least one of the dynamic parameters exceeds a predefined dynamic parameter.

Example 61 includes the subject matter of any one of Examples 57-60 and optionally, wherein the wireless communication device comprises a failsafe controller to shutdown one or more HW components of the multimode wireless radio transceiver in response to a failsafe message received from the remote device.

Example 62 includes the subject matter of any one of Examples 57-61 and optionally, wherein the RF monitor is embedded on the multimode wireless radio transceiver.

Example 63 includes the subject matter of any one of Examples 57-62 and optionally, wherein the RF monitor is to generate an alert message if at least one dynamic parameter of the one or more dynamic parameters exceeds a predefined parameter.

Example 64 includes the subject matter of Example 63 and optionally, wherein the RF monitor is to control the multimode wireless radio transceiver to transmit the alert message to the remote device.

Example 65 includes the subject matter of Example 64 and optionally, wherein the wireless communication device comprises a failsafe controller to shutdown one or more hardware (HW) components of the multimode wireless radio transceiver in response to a failsafe message received from the remote device, wherein the failsafe message is in response to the alert message.

Example 66 includes the subject matter of any one of Examples 63-65 and optionally, wherein the RF monitor is to provide the alert message to a protection domain controller (PDC).

Example 67 includes the subject matter of Example 66 and optionally, wherein the PDC is to restrict access of a configuration software to a protection domain of a plurality of protection domains of the multimode wireless radio transceiver based on a security level of the configuration software, wherein the protection domain includes one or more radio configuration parameters of the multimode wireless radio transceiver.

Example 68 includes a system comprising a wireless communication device including at least one antenna; a multimode wireless radio transceiver; and a failsafe controller to control an operation of a plurality of hardware (HW) components of the multimode wireless radio transceiver, the failsafe controller is to shutdown one or more HW components of the plurality of HW components based on a failsafe message received from a remote device.

Example 69 includes the subject matter of Example 68 and optionally, wherein the wireless communication device comprises a radio frequency (RF) monitor to monitor one or more dynamic parameters relating to RF transmissions of a multimode wireless radio transceiver.

Example 70 includes the subject matter of Example 69 and optionally, wherein the RF monitor is to generate an alert message if at least one dynamic parameter of the one or more dynamic parameters exceeds a predefined parameter.

Example 71 includes the subject matter of Example 70 and optionally, wherein the multimode wireless radio transceiver is to transmit the alert message to the remote device.

Example 72 includes the subject matter of Example 71 and optionally, wherein the failsafe message is in response to the alert message.

Example 73 includes the subject matter of any one of Examples 69-72 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 74 includes the subject matter of any one of Examples 69-73 and optionally, wherein the failsafe controller is to shutdown the one or more HW components of the multimode wireless radio transceiver if at least one of the dynamic parameters exceeds a predefined dynamic parameter.

Example 75 includes the subject matter of any one of Examples 68-74 and optionally, wherein the failsafe controller is embedded on the multimode wireless radio transceiver.

Example 76 includes the subject matter of any one of Examples 68-75 and optionally, wherein the wireless communication device comprises a protection domain controller (PDC) to restrict access of a configuration software to a protection domain of a plurality of protection domains of the multimode wireless radio transceiver based on a security level of the configuration software, wherein the protection domain includes one or more radio configuration parameters of the multimode wireless radio transceiver.

Example 77 includes a method comprising restricting access of a configuration software to a protection domain of a plurality of protection domains of a multimode wireless radio transceiver based on a security level of the configuration software, wherein the protection domain includes one or more radio configuration parameters of the multimode wireless radio transceiver.

Example 78 includes the subject matter of Example 77 and optionally, comprising enabling the configuration software to access the radio configuration parameters to configure the multimode wireless radio transceiver based on the security level.

Example 79 includes the subject matter of Example 77 or 78 and optionally, wherein the configuration software includes a launch policy, the method comprising determining the protection domain based on the launch policy.

Example 80 includes the subject matter of Example 79 and optionally, wherein the configuration software includes a code to configure the multimode radio transceiver, data to configure the radio configuration parameters, a public verification key, and a digital signature verifying the code and the data.

Example 81 includes the subject matter of Example 80 and optionally, comprising validating the digital signature with one or more stored verification keys.

Example 82 includes the subject matter of any one of Examples 77-81 and optionally, wherein the plurality of protection domains includes at least three different protection domains.

Example 83 includes the subject matter of Example 82 and optionally, wherein the three protection domains include an unprivileged protection domain in which no certification is required to access one or more radio resources of the unprivileged protection domain, a reduced privilege protection domain in which one or more internal certifications are required to access one or more radio resources of the reduced privilege domain, and a privileged protection domain in which one or more external certifications are required to access one or more radio resources of the privileged protection domain.

Example 84 includes the subject matter of any one of Examples 77-83 and optionally, comprising generating a hardware trap in response to an attempt of the configuration software to access a radio resource, which is not included in the protection domain.

Example 85 includes the subject matter of any one of Examples 77-84 and optionally, comprising monitoring one or more dynamic parameters of the multimode wireless radio transceiver, wherein the dynamic parameters relate to RF transmissions of the multimode wireless radio transceiver.

Example 86 includes the subject matter of Example 85 and optionally, comprising generating an alert message if at least one dynamic parameter of the one or more dynamic parameters exceeds a predefined parameter threshold.

Example 87 includes the subject matter of Example 86 and optionally, comprising transmitting the alert message to a remote device.

Example 88 includes the subject matter of Example 87 and optionally, comprising shutting down one or more hardware (HW) components of the multimode wireless radio transceiver in response to a failsafe message received from the remote device, wherein the failsafe message is in response to the alert message.

Example 89 includes the subject matter of any one of Examples 85-88 and optionally, comprising transmitting values of the one or more dynamic parameters to a remote device in response to a monitor request message received from the remote device.

Example 90 includes the subject matter of any one of Examples 85-89 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 91 includes the subject matter of Example 85 and optionally, comprising shutting down one or more Hardware (HW) components of the multimode wireless radio transceiver if at least one of the dynamic parameters exceeds a predefined dynamic parameter.

Example 92 includes the subject matter of any one of Examples 77-87 and optionally, comprising shutting down one or more Hardware (HW) components of the multimode wireless radio transceiver in response to a failsafe message received from a remote device.

Example 93 includes the subject matter of any one of Examples 77-92 and optionally, comprising storing a hash value representing the configuration software and transmitting the hash value to a remote device in response to an attestation request message received from the remote device.

Example 94 includes a method comprising monitoring one or more dynamic parameters relating to RF transmissions of a multimode wireless radio transceiver; and transmitting values of the one or more dynamic parameters to a remote device.

Example 95 includes the subject matter of Example 94 and optionally, comprising transmitting the values of the one or more dynamic parameters in response to a monitor request message received from the remote device.

Example 96 includes the subject matter of Example 94 or 95 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 97 includes the subject matter of any one of Examples 94-96 and optionally, comprising shutting down one or more HW components of the multimode wireless radio transceiver if at least one of the dynamic parameters exceeds a predefined dynamic parameter.

Example 98 includes the subject matter of any one of Examples 94-96 and optionally, comprising shutting down one or more HW components of the multimode wireless radio transceiver in response to a failsafe message received from the remote device.

Example 99 includes the subject matter of any one of Examples 94-98 and optionally, comprising generating an alert message if at least one dynamic parameter of the one or more dynamic parameters exceeds a predefined parameter.

Example 100 includes the subject matter of Example 99 and optionally, comprising transmitting the alert message to the remote device.

Example 101 includes the subject matter of Example 100 and optionally, comprising shutting down one or more hardware (HW) components of the multimode wireless radio transceiver in response to a failsafe message received from the remote device, wherein the failsafe message is in response to the alert message.

Example 102 includes the subject matter of any one of Examples 99-101 and optionally, comprising providing the alert message to a protection domain controller (PDC).

Example 103 includes the subject matter of any one of Examples 94-102 and optionally, comprising restricting access of a configuration software to a protection domain of a plurality of protection domains of the multimode wireless radio transceiver based on a security level of the configuration software, wherein the protection domain includes one or more radio configuration parameters of the multimode wireless radio transceiver.

Example 104 includes a method comprising controlling an operation of a plurality of hardware (HW) components of a multimode wireless radio transceiver; and shutting down one or more HW components of the plurality of HW components based on a failsafe message received from a remote device.

Example 105 includes the subject matter of Example 104 and optionally, comprising monitoring one or more dynamic parameters relating to RF transmissions of a multimode wireless radio transceiver.

Example 106 includes the subject matter of Example 105 and optionally, comprising generating an alert message if at least one dynamic parameter of the one or more dynamic parameters exceeds a predefined parameter.

Example 107 includes the subject matter of Example 106 and optionally, comprising transmitting the alert message to the remote device.

Example 108 includes the subject matter of Example 107 and optionally, wherein the failsafe message is in response to the alert message.

Example 109 includes the subject matter of any one of Examples 105-108 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 110 includes the subject matter of any one of Examples 105-109 and optionally, comprising shutting down the one or more HW components of the multimode wireless radio transceiver if at least one of the dynamic parameters exceeds a predefined dynamic parameter.

Example 111 includes the subject matter of any one of Examples 104-110 and optionally, comprising restricting access of a configuration software to a protection domain of a plurality of protection domains of the multimode wireless radio transceiver based on a security level of the configuration software, wherein the protection domain includes one or more radio configuration parameters of the multimode wireless radio transceiver.

Example 112 includes a product including a non-transitory storage medium having stored thereon instructions that, when executed by a machine, result in restricting access of a configuration software to a protection domain of a plurality of protection domains of a multimode wireless radio transceiver based on a security level of the configuration software, wherein the protection domain includes one or more restricted radio resources including one or more radio configuration parameters of the multimode wireless radio transceiver.

Example 113 includes the subject matter of Example 112 and optionally, wherein the instructions result in enabling the configuration software to access the radio configuration parameters to configure the multimode wireless radio transceiver based on the security level.

Example 114 includes the subject matter of Example 112 or 113 and optionally, wherein the configuration software includes a launch policy, and wherein the PDC is to determine the protection domain based on the launch policy.

Example 115 includes the subject matter of Example 114 and optionally, wherein the configuration software includes a code to configure the multimode radio transceiver, data to configure the radio configuration parameters, a public verification key, and a digital signature verifying the code and the data.

Example 116 includes the subject matter of Example 115 and optionally, wherein the instructions result in validating the digital signature with one or more stored verification keys.

Example 117 includes the subject matter of any one of Examples 112-116 and optionally, wherein the plurality of protection domains includes at least three different protection domains.

Example 118 includes the subject matter of Example 117 and optionally, wherein the three protection domains include an unprivileged protection domain in which no certification is required to access one or more radio resources of the unprivileged protection domain, a reduced privilege protection domain in which one or more internal certifications are required to access one or more radio resources of the reduced privilege protection domain, and a privileged protection domain in which one or more external certifications are required to access one or more radio resources of the privileged protection domain.

Example 119 includes the subject matter of any one of Examples 112-118 and optionally, wherein the instructions result in generating a hardware trap in response to an attempt of the configuration software to access a radio resource, which is not included in the protection domain.

Example 120 includes the subject matter of any one of Examples 112-119 and optionally, wherein the instructions result in monitoring one or more dynamic parameters of the multimode wireless radio transceiver, wherein the dynamic parameters relate to RF transmissions of the multimode wireless radio transceiver.

Example 121 includes the subject matter of Example 120 and optionally, wherein the instructions result in generating an alert message if at least one dynamic parameter of the one or more dynamic parameters exceeds a predefined parameter threshold.

Example 122 includes the subject matter of Example 121 and optionally, wherein the instructions result in transmitting the alert message to a remote device.

Example 123 includes the subject matter of Example 122 and optionally, wherein the instructions result in shutting down one or more hardware (HW) components of the multimode wireless radio transceiver in response to a failsafe message received from the remote device, wherein the failsafe message is in response to the alert message.

Example 124 includes the subject matter of any one of Examples 120-123 and optionally, wherein the instructions result in transmitting values of the one or more dynamic parameters to a remote device in response to a monitor request message received from the remote device.

Example 125 includes the subject matter of any one of Examples 120-124 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 126 includes the subject matter of Example 120 and optionally, wherein the instructions result in shutting down one or more Hardware (HW) components of the multimode wireless radio transceiver if at least one of the dynamic parameters exceeds a predefined dynamic parameter.

Example 127 includes the subject matter of any one of Examples 112-122 and optionally, wherein the instructions result in shutting down one or more Hardware (HW) components of the multimode wireless radio transceiver in response to a failsafe message received from a remote device.

Example 128 includes the subject matter of any one of Examples 112-127 and optionally, wherein the instructions result in storing a hash value representing the configuration software and transmitting the hash value to a remote device in response to an attestation request message received from the remote device Example 129 includes a product including a non-transitory storage medium having stored thereon instructions that, when executed by a machine, result in monitoring one or more dynamic parameters relating to RF transmissions of a multimode wireless radio transceiver; and transmitting values of the one or more dynamic parameters to a remote device.

Example 130 includes the subject matter of Example 129 and optionally, wherein the instructions result in transmitting the values of the one or more dynamic parameters in response to a monitor request message received from the remote device.

Example 131 includes the subject matter of Example 129 or 130 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 132 includes the subject matter of any one of Examples 129-131 and optionally, wherein the instructions result in shutting down one or more HW components of the multimode wireless radio transceiver if at least one of the dynamic parameters exceeds a predefined dynamic parameter.

Example 133 includes the subject matter of any one of Examples 129-131 and optionally, wherein the instructions result in shutting down one or more HW components of the multimode wireless radio transceiver in response to a failsafe message received from the remote device.

Example 134 includes the subject matter of any one of Examples 129-133 and optionally, wherein the instructions result in generating an alert message if at least one dynamic parameter of the one or more dynamic parameters exceeds a predefined parameter.

Example 135 includes the subject matter of Example 134 and optionally, wherein the instructions result in transmitting the alert message to the remote device.

Example 136 includes the subject matter of Example 135 and optionally, wherein the instructions result in shutting down one or more hardware (HW) components of the multimode wireless radio transceiver in response to a failsafe message received from the remote device, wherein the failsafe message is in response to the alert message.

Example 137 includes the subject matter of any one of Examples 134-136 and optionally, wherein the instructions result in providing the alert message to a protection domain controller (PDC).

Example 138 includes the subject matter of any one of Examples 129-137 and optionally, wherein the instructions result in restricting access of a configuration software to a protection domain of a plurality of protection domains of the multimode wireless radio transceiver based on a security level of the configuration software, wherein the protection domain includes one or more radio configuration parameters of the multimode wireless radio transceiver.

Example 139 includes a product including a non-transitory storage medium having stored thereon instructions that, when executed by a machine, result in controlling operation of a plurality of hardware (HW) components of a multimode wireless radio transceiver; and shutting down one or more HW components of the plurality of HW components based on a failsafe message received from a remote device.

Example 140 includes the subject matter of Example 139 and optionally, wherein the instructions result in monitoring one or more dynamic parameters relating to RF transmissions of a multimode wireless radio transceiver.

Example 141 includes the subject matter of Example 140 and optionally, wherein the instructions result in generating an alert message if at least one dynamic parameter of the one or more dynamic parameters exceeds a predefined parameter.

Example 142 includes the subject matter of Example 141 and optionally, wherein the instructions result in transmitting the alert message to the remote device.

Example 143 includes the subject matter of Example 142 and optionally, wherein the failsafe message is in response to the alert message.

Example 144 includes the subject matter of any one of Examples 140-143 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 145 includes the subject matter of any one Examples 139-144 and optionally, wherein the instructions result in shutting down the one or more HW components of the multimode wireless radio transceiver if at least one of the dynamic parameters exceeds a predefined dynamic parameter.

Example 146 includes the subject matter of any one of Examples 139-145 and optionally, wherein the instructions result in restricting access of a configuration software to a protection domain of a plurality of protection domains of the multimode wireless radio transceiver based on a security level of the configuration software, wherein the protection domain includes one or more radio configuration parameters of the multimode wireless radio transceiver.

Example 147 includes an apparatus comprising means for restricting access of a configuration software to a protection domain of a plurality of protection domains of a multimode wireless radio transceiver based on a security level of the configuration software, wherein the protection domain includes one or more radio configuration parameters of the multimode wireless radio transceiver.

Example 148 includes the subject matter of Example 147 and optionally, comprising means for enabling the configuration software to access the radio configuration parameters to configure the multimode wireless radio transceiver based on the security level.

Example 149 includes the subject matter of Example 147 or 148 and optionally, wherein the configuration software includes a launch policy, and wherein the PDC is to determine the protection domain based on the launch policy.

Example 150 includes the subject matter of Example 149 and optionally, wherein the configuration software includes a code to configure the multimode radio transceiver, data to configure the radio configuration parameters, a public verification key, and a digital signature verifying the code and the data.

Example 151 includes the subject matter of Example 150 and optionally, comprising means for validating the digital signature with one or more stored verification keys.

Example 152 includes the subject matter of any one of Examples 147-151 and optionally, wherein the plurality of protection domains includes at least three different protection domains.

Example 153 includes the subject matter of Example 152 and optionally, wherein the three protection domains include an unprivileged protection domain in which no certification is required to access one or more radio resources of the unprivileged protection domain, a reduced privilege protection domain in which one or more internal certifications are required to access one or more radio resources of the reduced privilege protection domain, and a privileged protection domain in which one or more external certifications are required to access one or more radio resources of the privileged protection domain.

Example 154 includes the subject matter of any one of Examples 147-153 and optionally, comprising means for generating a hardware trap in response to an attempt of the configuration software to access a radio resource, which is not included in the protection domain.

Example 155 includes the subject matter of any one of Examples 147-154 and optionally, comprising means for monitoring one or more dynamic parameters of the multimode wireless radio transceiver, wherein the dynamic parameters relate to RF transmissions of the multimode wireless radio transceiver.

Example 156 includes the subject matter of Example 155 and optionally, comprising means for generating an alert message if at least one dynamic parameter of the one or more dynamic parameters exceeds a predefined parameter threshold.

Example 157 includes the subject matter of Example 156 and optionally, comprising means for transmitting the alert message to a remote device.

Example 158 includes the subject matter of Example 157 and optionally, comprising means for shutting down one or more hardware (HW) components of the multimode wireless radio transceiver in response to a failsafe message received from the remote device, wherein the failsafe message is in response to the alert message.

Example 159 includes the subject matter of any one of Examples 155-158 and optionally, comprising means for transmitting values of the one or more dynamic parameters to a remote device in response to a monitor request message received from the remote device.

Example 160 includes the subject matter of any one of Examples 155-159 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 161 includes the subject matter of Example 155 and optionally, comprising means for shutting down one or more Hardware (HW) components of the multimode wireless radio transceiver if at least one of the dynamic parameters exceeds a predefined dynamic parameter.

Example 162 includes the subject matter of any one of Examples 147-157 and optionally, comprising means for shutting down one or more Hardware (HW) components of the multimode wireless radio transceiver in response to a failsafe message received from a remote device.

Example 163 includes the subject matter of any one of Examples 147-162 and optionally, comprising means for storing a hash value representing the configuration software and transmitting the hash value to a remote device in response to an attestation request message received from the remote device Example 164 includes an apparatus comprising means for monitoring one or more dynamic parameters relating to RF transmissions of a multimode wireless radio transceiver; and means for transmitting values of the one or more dynamic parameters to a remote device.

Example 165 includes the subject matter of Example 164 and optionally, comprising means for transmitting the values of the one or more dynamic parameters in response to a monitor request message received from the remote device.

Example 166 includes the subject matter of Example 164 or 165 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 167 includes the subject matter of any one of Examples 164-166 and optionally, comprising means for shutting down one or more HW components of the multimode wireless radio transceiver if at least one of the dynamic parameters exceeds a predefined dynamic parameter.

Example 168 includes the subject matter of any one of Examples 164-166 and optionally, comprising means for shutting down one or more HW components of the multimode wireless radio transceiver in response to a failsafe message received from the remote device.

Example 169 includes the subject matter of any one of Examples 164-168 and optionally, comprising means for generating an alert message if at least one dynamic parameter of the one or more dynamic parameters exceeds a predefined parameter.

Example 170 includes the subject matter of Example 169 and optionally, comprising means for transmitting the alert message to the remote device.

Example 171 includes the subject matter of Example 170 and optionally, comprising means for shutting down one or more hardware (HW) components of the multimode wireless radio transceiver in response to a failsafe message received from the remote device, wherein the failsafe message is in response to the alert message.

Example 172 includes the subject matter of any one of Examples 169-171 and optionally, comprising means for providing the alert message to a protection domain controller (PDC).

Example 173 includes the subject matter of any one of Examples 164-172 and optionally, comprising means for restricting access of a configuration software to a protection domain of a plurality of protection domains of the multimode wireless radio transceiver based on a security level of the configuration software, wherein the protection domain includes one or more radio configuration parameters of the multimode wireless radio transceiver.

Example 174 includes an apparatus comprising means for controlling an operation of a plurality of hardware (HW) components of a multimode wireless radio transceiver; and means for shutting down one or more HW components of the plurality of HW components based on a failsafe message received from a remote device.

Example 175 includes the subject matter of Example 174 and optionally, comprising means for monitoring one or more dynamic parameters relating to RF transmissions of a multimode wireless radio transceiver.

Example 176 includes the subject matter of Example 175 and optionally, comprising means for generating an alert message if at least one dynamic parameter of the one or more dynamic parameters exceeds a predefined parameter.

Example 177 includes the subject matter of Example 176 and optionally, comprising means for transmitting the alert message to the remote device.

Example 178 includes the subject matter of Example 177 and optionally, wherein the failsafe message is in response to the alert message.

Example 179 includes the subject matter of any one of Examples 175-178 and optionally, wherein the one or more dynamic parameters include one or more RF parameters selected from the group consisting of a transmission power of the multimode wireless radio transceiver, a transmission frequency of the multimode wireless radio transceiver, and an RF modulation of the multimode wireless radio transceiver.

Example 180 includes the subject matter of any one of Examples 175-179 and optionally, comprising means for shutting down the one or more HW components of the multimode wireless radio transceiver if at least one of the dynamic parameters exceeds a predefined dynamic parameter.

Example 181 includes the subject matter of any one of Examples 174-180 and optionally, comprising means for restricting access of a configuration software to a protection domain of a plurality of protection domains of the multimode wireless radio transceiver based on a security level of the configuration software, wherein the protection domain includes one or more radio configuration parameters of the multimode wireless radio transceiver.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
one or more memory components configured to store a plurality of radio configuration parameters to configure one or more functionalities of a multimode wireless radio transceiver; and
a protection domain controller (PDC) component configured to control access to a plurality of protection domains corresponding to a plurality of security levels, a protection domain of said plurality of protection domains is configured to enable access to one or more radio configuration parameters of said plurality of configuration parameters, the plurality of protection domains comprising
at least a reduced privilege protection domain in which one or more internal certifications are required to access at least one radio configuration parameter of said reduced privilege protection domain, and
a privileged protection domain in which one or more external certifications are required to access at least one radio configuration parameter of said privileged protection domain, the PDC component is configured to process a launch policy of a configuration software, the launch policy to indicate a security level of the configuration software,
the configuration software comprising a code to configure said multimode wireless radio transceiver, data to configure at least one of said plurality of radio configuration parameters, a public verification key, and a digital signature verifying said code and said data, the PDC component is configured to determine a selected protection domain of said plurality of protection domains based on the launch policy, and to restrict access of the configuration software to the selected protection domain.

2. The apparatus of claim 1, wherein said PDC component is configured to enable said configuration software to access said radio configuration parameters to configure said multimode wireless radio transceiver based on said security level.

3. The apparatus of claim 1, wherein said PDC component is configured to validate said digital signature with one or more stored verification keys, said PDC component is configured enable said configuration software to access said selected protection domain only if the digital signature is successfully validated.

4. The apparatus of claim 1, wherein said plurality of protection domains includes at least three different protection domains.

5. The apparatus of claim 1, wherein said plurality of protection domains include at least an unprivileged protection domain in which no certification is required to access one or more radio configuration parameters of said unprivileged protection domain.

6. The apparatus of claim 1, wherein said PDC component is configured to generate a hardware trap in response to an attempt of said configuration software to access a radio configuration parameter, which is not included in said protection domain.

7. The apparatus of claim 1 comprising a radio frequency (RF) monitor component configured to monitor one or more dynamic parameters of said multimode wireless radio transceiver, wherein said dynamic parameters relate to RF transmissions of said multimode wireless radio transceiver.

8. The apparatus of claim 7, wherein said RF monitor component is configured to generate an alert message if at least one dynamic parameter of said one or more dynamic parameters exceeds a predefined parameter threshold.

9. The apparatus of claim 7, wherein said PDC component is configured to trigger said multimode wireless radio transceiver to transmit values of said one or more dynamic parameters to a remote device in response to a monitor request message received from said remote device.

10. The apparatus of claim 7, wherein said one or more dynamic parameters include one or more RF parameters selected from a group consisting of a transmission power of said multimode wireless radio transceiver, a transmission frequency of said multimode wireless radio transceiver, and an RF modulation of said multimode wireless radio transceiver.

11. The apparatus of claim 1 comprising a failsafe controller component configured to shutdown one or more Hardware (HW) components of said multimode wireless radio transceiver in response to a failsafe message received from a remote device.

12. The apparatus of claim 1, wherein said PDC component is configured to store a hash value representing said configuration software and to transmit said hash value to a remote device in response to an attestation request message received from said remote device.

13. A system comprising:
a wireless communication device including:
at least one antenna;
a multimode wireless radio transceiver;
one or more memory components configured to store a plurality of radio configuration parameters to configure one or more functionalities of said multimode wireless radio transceiver;
a protection domain controller (PDC) component configured to control access to a plurality of protection domains corresponding to a plurality of security levels, a protection domain of said plurality of protection domains is configured to enable access to one or more radio configuration parameters of said plurality of configuration parameters, the plurality of protection domains comprising
at least a reduced privilege protection domain in which one or more internal certifications are required to access at least one radio configuration parameter of said reduced privilege protection domain, and
a privileged protection domain in which one or more external certifications are required to access at least one radio configuration parameter of said privileged protection domain, the PDC component is configured to process a launch policy of a configuration software, the launch policy to indicate a security level of the configuration software, the configuration software comprising a code to configure said multimode wireless radio transceiver, data to configure at least one of said plurality of radio configuration parameters, a public verification key, and a digital signature verifying said code and said data, the PDC component is configured to determine a selected protection domain of said plurality of protection domains based on the launch policy, and to restrict access of the configuration software to the selected protection domain; and a radio frequency (RF) monitor component configured to monitor one or more dynamic parameters relating to RF transmissions of said multimode wireless radio transceiver, and to trigger said multimode wireless radio transceiver to transmit values of said one or more dynamic parameters to a remote device.

14. The system of claim 13, wherein said RF monitor component is configured to trigger said wireless radio transceiver to transmit said values of said one or more dynamic parameters in response to a monitor request message received from said remote device.

15. The system of claim 13, wherein said one or more dynamic parameters include one or more RF parameters selected from a group consisting of a transmission power of said multimode wireless radio transceiver, a transmission frequency of said multimode wireless radio transceiver, and an RF modulation of said multi mode wireless radio transceiver.

16. The system of claim 13, wherein said RF monitor component is configured to generate an alert message if at least one dynamic parameter of said one or more dynamic parameters exceeds a predefined parameter.

17. The system of claim 16, wherein said RF monitor component is configured to trigger said multimode wireless radio transceiver to transmit said alert message to said remote device.

18. A method to be performed by a wireless device comprising a multimode wireless radio transceiver, the method comprising:

storing in one or more memory components a plurality of radio configuration parameters to configure one or more functionalities of said multimode wireless radio transceiver;

configuring a plurality of protection domains corresponding to a plurality of security levels, a protection domain of said plurality of protection domains is configured to enable access to one or more radio configuration parameters of said plurality of configuration parameters, the plurality of protection domains comprising at least a reduced privilege protection domain in which one or more internal certifications are required to access at least one radio configuration parameter of said reduced privilege protection domain, and a privileged protection domain in which one or more external certifications are required to access at least one radio configuration parameter of said privileged protection domain;

processing a launch policy indicating a security level of a configuration software, the configuration software comprising a code to configure said multimode wireless radio transceiver, data to configure at least one of said plurality of radio configuration parameters, a public verification key, and a digital signature verifying said code and said data;

determining a selected protection domain of said plurality of protection domains based on the launch policy; and restricting access of the configuration software to the selected protection domain.

19. The method of claim 18 comprising monitoring one or more dynamic parameters of said multimode wireless radio transceiver, and transmitting values of said one or more dynamic parameters to a remote device, wherein said dynamic parameters relate to RF transmissions of said multimode wireless radio transceiver.

20. The method of claim 18 comprising generating a hardware trap in response to an attempt of said configuration software to access a radio configuration parameter, which is not included in said protection domain.

21. A product including a non-transitory storage medium having stored thereon instructions that, when executed by a machine, result in:

storing in one or more memory components a plurality of radio configuration parameters to configure one or more functionalities of a multimode wireless radio transceiver;

configuring a plurality of protection domains corresponding to a plurality of security levels, a protection domain of said plurality of protection domains is configured to enable access to one or more radio configuration parameters of said plurality of configuration parameters, the plurality of protection domains comprising at least a reduced privilege protection domain in which one or more internal certifications are required to access at least one radio configuration parameter of said reduced privilege protection domain, and a privileged protection domain in which one or more external certifications are required to access at least one radio configuration parameter of said privileged protection domain;

processing a launch policy indicating a security level of a configuration software, the configuration software comprising a code to configure said multimode wireless radio transceiver, data to configure at least one of said plurality of radio configuration parameters, a public verification key, and a digital signature verifying said code and said data;

determining a selected protection domain of said plurality of protection domains based on the launch policy; and restricting access of the configuration software to the selected protection domain.

22. The product of claim 21, wherein said instructions result in:

controlling operation of a plurality of hardware (HW) components of said multimode wireless radio transceiver; and shutting down one or more HW components of said plurality of HW components based on a failsafe message received from a remote device.

23. The product of claim 22, wherein said instructions result in monitoring one or more dynamic parameters relating to RF transmissions of said multimode wireless radio transceiver, and shutting down said one or more HW components of said multimode wireless radio transceiver if at least one of said dynamic parameters exceeds a predefined dynamic parameter.

* * * * *